US 12,142,936 B2

(12) United States Patent
Lagree et al.

(10) Patent No.: US 12,142,936 B2
(45) Date of Patent: *Nov. 12, 2024

(54) WIRELESS POWER SYSTEM FOR AN EXERCISE MACHINE

(71) Applicant: Lagree Technologies, Inc., Chatsworth, CA (US)

(72) Inventors: Sebastien Anthony Louis Lagree, Chatsworth, CA (US); Samuel D. Cox, Yuba City, CA (US); Todd G. Remund, Yuba City, CA (US)

(73) Assignee: Lagree Technologies, Inc., Chatsworth, CA (US)

( * ) Notice: Subject to any disclaimer, the term of this patent is extended or adjusted under 35 U.S.C. 154(b) by 244 days.

This patent is subject to a terminal disclaimer.

(21) Appl. No.: 17/950,487

(22) Filed: Sep. 22, 2022

(65) Prior Publication Data

US 2023/0019585 A1 Jan. 19, 2023

Related U.S. Application Data

(63) Continuation of application No. 17/088,883, filed on Nov. 4, 2020, now Pat. No. 11,456,623.

(51) Int. Cl.
*H02J 50/10* (2016.01)
*A63B 21/00* (2006.01)
(Continued)

(52) U.S. Cl.
CPC ............ *H02J 50/10* (2016.02); *A63B 21/023* (2013.01); *A63B 21/0552* (2013.01); *A63B 21/4045* (2015.10); *H02J 7/0042* (2013.01)

(58) Field of Classification Search
CPC ........ H02J 50/10; H02J 7/0042; H02J 50/005; H02J 50/05; A63B 21/023;
(Continued)

(56) References Cited

U.S. PATENT DOCUMENTS

| 1,621,477 | A | 3/1927 | Pilates |
| 3,770,267 | A | 11/1973 | McCarthy |

(Continued)

FOREIGN PATENT DOCUMENTS

| EP | 3422530 A1 | 1/2019 |
| WO | 2004096376 A1 | 11/2004 |

OTHER PUBLICATIONS https://www.amazon.com/gp/product/B076GZ59HR/ref=ppx_yo_dt_b_search_asin_title?ie=UTF8&psc=; Amazon Webpage for Taidacent 12V 2A High Power 8mm ~ 18mm Wireless Charging Module; Jan. 6, 2017.

*Primary Examiner* — Loan B Jimenez
*Assistant Examiner* — Andrew M Kobylarz
(74) *Attorney, Agent, or Firm* — Neustel Law Offices

(57) ABSTRACT

A wireless power system for an exercise machine for providing electrical power wirelessly to an electrical energy storage device or electrical energy consuming device attached to a movable carriage of an exercise machine. The wireless power system for an exercise machine generally includes an exercise machine which includes a frame having one or more rails. A carriage is movably positioned upon the rails to allow an exerciser to move the carriage when performing an exercise. A wireless power receiver is attached to the carriage that wirelessly receives electrical energy transferred from a wireless power transmitter. An electrical energy storage device or an electrical energy consuming device attached to the movable carriage is electrically connected to the wireless power receiver to receive electrical power from the wireless power receiver.

20 Claims, 14 Drawing Sheets

(51) Int. Cl.
  *A63B 21/02* (2006.01)
  *A63B 21/055* (2006.01)
  *H02J 7/00* (2006.01)

(58) Field of Classification Search
  CPC ............ A63B 21/0552; A63B 21/4045; A63B 2071/0683; A63B 2220/10; A63B 2220/30; A63B 2220/40; A63B 2225/20; A63B 2230/04; A63B 2230/06; A63B 24/0087; A63B 21/0428; A63B 2071/0655; A63B 2225/74; A63B 2230/65; A63B 22/0089; A63B 2225/50; A63B 2230/207; A63B 2230/50
  See application file for complete search history.

(56) References Cited

U.S. PATENT DOCUMENTS

| | | | |
|---|---|---|---|
| 4,759,540 A | 7/1988 | Yu | |
| 4,798,378 A | 1/1989 | Jones | |
| 4,875,674 A | 10/1989 | Dreissigacker | |
| 5,066,005 A | 11/1991 | Luecke | |
| 5,263,913 A | 11/1993 | Boren | |
| D362,700 S | 9/1995 | Breibart | |
| D382,319 S | 8/1997 | Gerschefske | |
| 5,681,249 A | 10/1997 | Endelman | |
| 5,885,197 A | 3/1999 | Barton | |
| 5,967,955 A | 10/1999 | Westfall | |
| 6,179,753 B1 | 1/2001 | Barker | |
| 7,163,500 B2 | 1/2007 | Endelman | |
| 7,803,095 B1 | 9/2010 | Lagree | |
| 7,931,570 B2 | 4/2011 | Hoffman | |
| 8,249,714 B1 | 8/2012 | Hartman | |
| 8,585,554 B2 | 11/2013 | Shavit | |
| 8,641,585 B2 | 2/2014 | Lagree | |
| 9,072,931 B2 | 7/2015 | Lagree | |
| 9,119,989 B1 | 9/2015 | Lagree | |
| 9,138,606 B2 | 9/2015 | Lagree | |
| 9,211,440 B2 | 12/2015 | Lagree | |
| 9,283,422 B2 | 3/2016 | Lagree | |
| 9,362,776 B2 | 6/2016 | Low | |
| 9,370,679 B2 | 6/2016 | Lagree | |
| 9,393,454 B2 | 7/2016 | Lagree | |
| D764,606 S | 8/2016 | Lagree | |
| 9,415,253 B2 | 8/2016 | Lagree | |
| 9,457,216 B2 | 10/2016 | Lagree | |
| 9,457,225 B2 | 10/2016 | Lagree | |
| 9,474,924 B2 | 10/2016 | Lagree | |
| 9,474,926 B1 | 10/2016 | Lagree | |
| 9,474,927 B2 | 10/2016 | Lagree | |
| D772,922 S | 11/2016 | Lagree | |
| 9,498,667 B1 | 11/2016 | Lagree | |
| 9,517,375 B2 | 12/2016 | Lagree | |
| 9,522,299 B2 | 12/2016 | Lagree | |
| 9,533,184 B1 | 1/2017 | Lagree | |
| 9,533,185 B1 | 1/2017 | Lagree | |
| 9,545,535 B2 | 1/2017 | Lagree | |
| 9,555,282 B1 | 1/2017 | Lagree | |
| 9,579,536 B1 | 2/2017 | Lagree | |
| 9,579,555 B2 | 2/2017 | Lagree | |
| 9,586,081 B2 | 3/2017 | Lagree | |
| 9,586,089 B2 | 3/2017 | Lagree | |
| 9,597,545 B1 | 3/2017 | Lagree | |
| 9,604,095 B1 | 3/2017 | Lagree | |
| 9,604,097 B1 | 3/2017 | Lagree | |
| D785,104 S | 4/2017 | Lagree | |
| 9,643,051 B1 | 5/2017 | Lagree | |
| 9,649,526 B2 | 5/2017 | Lagree | |
| 9,649,527 B1 | 5/2017 | Lagree | |
| D789,463 S | 6/2017 | Lagree | |
| 9,700,754 B2 | 7/2017 | Lagree | |
| 9,717,945 B2 | 8/2017 | Lagree | |
| 9,744,395 B1 | 8/2017 | Lagree | |
| 9,776,043 B2 | 10/2017 | Lagree | |
| 9,776,062 B2 | 10/2017 | Lagree | |
| 9,789,354 B2 | 10/2017 | Lagree | |
| 9,808,664 B2 | 11/2017 | Lagree | |
| 9,849,330 B2 | 12/2017 | Lagree | |
| 9,868,009 B2 | 1/2018 | Lagree | |
| 9,868,010 B2 | 1/2018 | Lagree | |
| 9,868,011 B2 | 1/2018 | Lagree | |
| 9,868,018 B2 | 1/2018 | Lagree | |
| 9,868,019 B2 | 1/2018 | Lagree | |
| 9,914,014 B2 | 3/2018 | Lagree | |
| 9,962,573 B2 | 5/2018 | Lagree | |
| 9,962,592 B2 | 5/2018 | Lagree | |
| 9,981,156 B2 | 5/2018 | Lagree | |
| 10,016,655 B2 | 7/2018 | Lagree | |
| 10,022,577 B2 | 7/2018 | Lagree | |
| 10,022,581 B2 | 7/2018 | Lagree | |
| 10,029,141 B2 | 7/2018 | Lagree | |
| 10,046,193 B1 | 8/2018 | Aronson | |
| 10,052,518 B2 | 8/2018 | Lagree | |
| 10,065,069 B1 | 9/2018 | Lagree | |
| 10,109,216 B2 | 10/2018 | Lagree | |
| 10,118,067 B2 | 11/2018 | Lagree | |
| 10,124,232 B2 | 11/2018 | Lagree | |
| 10,143,882 B2 | 12/2018 | Lagree | |
| 10,150,003 B2 | 12/2018 | Lagree | |
| 10,155,129 B2 | 12/2018 | Lagree | |
| 10,201,724 B2 | 2/2019 | Lagree | |
| 10,213,641 B2 | 2/2019 | Lagree | |
| 10,220,244 B2 | 3/2019 | Lagree | |
| 10,238,910 B2 | 3/2019 | Lagree | |
| 10,265,573 B2 | 4/2019 | Lagree | |
| 10,272,285 B2 | 4/2019 | Lagree | |
| 10,279,207 B2 | 5/2019 | Lagree | |
| 10,300,328 B2 | 5/2019 | Lagree | |
| 10,369,398 B2 | 8/2019 | Lagree | |
| 10,478,656 B2 | 11/2019 | Lagree | |
| 10,478,663 B2 | 11/2019 | Lagree | |
| 10,486,017 B1 | 11/2019 | Lagree | |
| 10,493,321 B2 | 12/2019 | Lagree | |
| 10,500,441 B2 | 12/2019 | Lagree | |
| 10,518,127 B2 | 12/2019 | Lagree | |
| 10,549,140 B2 | 2/2020 | Lagree | |
| 10,561,896 B2 | 2/2020 | Lagree | |
| 10,569,118 B2 | 2/2020 | Lagree | |
| 10,603,546 B1 | 3/2020 | Lagree | |
| 10,695,645 B1 | 6/2020 | Lagree | |
| 10,702,730 B2 | 7/2020 | Lagree | |
| 10,702,760 B2 | 7/2020 | Lagree | |
| 10,716,964 B1 | 7/2020 | Lagree | |
| 10,744,370 B1 | 8/2020 | Lagree | |
| 10,751,600 B2 | 8/2020 | Lagree | |
| 10,780,307 B2 | 9/2020 | Lagree | |
| 10,792,528 B1 | 10/2020 | Lagree | |
| 10,792,538 B2 | 10/2020 | Lagree | |
| 11,224,781 B2 | 1/2022 | Fima | |
| 11,456,623 B2 * | 9/2022 | Lagree | ............... A63B 22/0089 |
| 2001/0056011 A1 | 12/2001 | Endelman | |
| 2003/0119635 A1 | 6/2003 | Arbuckle | |
| 2005/0130810 A1 | 6/2005 | Sands | |
| 2005/0164856 A1 | 7/2005 | Parmater | |
| 2006/0046914 A1 | 3/2006 | Endelman | |
| 2006/0176015 A1 | 8/2006 | Bersenev | |
| 2006/0199712 A1 | 9/2006 | Barnard | |
| 2007/0087921 A1 | 4/2007 | Graham | |
| 2008/0070765 A1 | 3/2008 | Brown | |
| 2008/0248935 A1 | 10/2008 | Solow | |
| 2010/0227748 A1 | 9/2010 | Campanaro | |
| 2011/0009249 A1 | 1/2011 | Campanaro | |
| 2011/0143898 A1 | 6/2011 | Trees | |
| 2011/0166002 A1 | 7/2011 | Savsek | |
| 2011/0172069 A1 | 7/2011 | Gerschefske | |
| 2012/0295771 A1 | 11/2012 | Lagree | |
| 2013/0017935 A1 | 1/2013 | Endelman | |
| 2013/0196835 A1 | 8/2013 | Solow | |
| 2014/0011645 A1 | 1/2014 | Johnson | |
| 2014/0100089 A1 | 4/2014 | Kermath | |
| 2014/0121076 A1 | 5/2014 | Lagree | |
| 2014/0121078 A1 | 5/2014 | Lagree | |
| 2014/0121079 A1 | 5/2014 | Lagree | |
| 2014/0141948 A1 | 5/2014 | Aronson | |

(56) References Cited

U.S. PATENT DOCUMENTS

| | | |
|---|---|---|
| 2015/0024914 A1 | 1/2015 | Lagree |
| 2015/0057127 A1 | 2/2015 | Lagree |
| 2015/0065318 A1 | 3/2015 | Lagree |
| 2015/0072841 A1 | 3/2015 | Lagree |
| 2015/0141204 A1 | 5/2015 | Lagree |
| 2015/0217164 A1 | 8/2015 | Lagree |
| 2015/0220523 A1 | 8/2015 | Lagree |
| 2015/0246263 A1 | 9/2015 | Campanaro |
| 2015/0297944 A1 | 10/2015 | Lagree |
| 2015/0343250 A1 | 12/2015 | Lagree |
| 2015/0360068 A1 | 12/2015 | Lagree |
| 2015/0360083 A1 | 12/2015 | Lagree |
| 2015/0360113 A1 | 12/2015 | Lagree |
| 2015/0364058 A1 | 12/2015 | Lagree |
| 2015/0367166 A1 | 12/2015 | Lagree |
| 2016/0008657 A1 | 1/2016 | Lagree |
| 2016/0059060 A1 | 3/2016 | Lagree |
| 2016/0059061 A1 | 3/2016 | Lagree |
| 2016/0096059 A1 | 4/2016 | Lagree |
| 2016/0166870 A1 | 6/2016 | Lagree |
| 2016/0193496 A1 | 7/2016 | Lagree |
| 2016/0256733 A1 | 9/2016 | Lagree |
| 2016/0271452 A1 | 9/2016 | Lagree |
| 2016/0317858 A1 | 11/2016 | Lagree |
| 2016/0346593 A1 | 12/2016 | Lagree |
| 2016/0361602 A1 | 12/2016 | Lagree |
| 2017/0014664 A1 | 1/2017 | Lagree |
| 2017/0014672 A1 | 1/2017 | Lagree |
| 2017/0036057 A1 | 2/2017 | Lagree |
| 2017/0036061 A1 | 2/2017 | Lagree |
| 2017/0065846 A1 | 3/2017 | Lagree |
| 2017/0072252 A1 | 3/2017 | Lagree |
| 2017/0087397 A1 | 3/2017 | Lagree |
| 2017/0100625 A1 | 4/2017 | Lagree |
| 2017/0100629 A1 | 4/2017 | Lagree |
| 2017/0106232 A1 | 4/2017 | Lagree |
| 2017/0113091 A1 | 4/2017 | Lagree |
| 2017/0120101 A1 | 5/2017 | Lagree |
| 2017/0144013 A1 | 5/2017 | Lagree |
| 2017/0157452 A1 | 6/2017 | Lagree |
| 2017/0157458 A1 | 6/2017 | Lagree |
| 2017/0165518 A1 | 6/2017 | Lagree |
| 2017/0165555 A1 | 6/2017 | Lagree |
| 2017/0189740 A1 | 7/2017 | Lagree |
| 2017/0189741 A1 | 7/2017 | Lagree |
| 2017/0209728 A1 | 7/2017 | Lagree |
| 2017/0239526 A1 | 8/2017 | Lagree |
| 2017/0246491 A1 | 8/2017 | Lagree |
| 2017/0246499 A1 | 8/2017 | Lagree |
| 2017/0296865 A1 | 10/2017 | Lagree |
| 2017/0304673 A1 | 10/2017 | Lagree |
| 2017/0326406 A1 | 11/2017 | Lagree |
| 2017/0340947 A1 | 11/2017 | Lagree |
| 2017/0354840 A1 | 12/2017 | Lagree |
| 2018/0013308 A1 | 1/2018 | Huang |
| 2018/0015319 A1 | 1/2018 | Lagree |
| 2018/0021621 A1 | 1/2018 | Lagree |
| 2018/0021655 A1 | 1/2018 | Lagree |
| 2018/0036583 A1 | 2/2018 | Lagree |
| 2018/0056109 A1 | 3/2018 | Lagree |
| 2018/0056133 A1 | 3/2018 | Lagree |
| 2018/0111020 A1 | 4/2018 | Lagree |
| 2018/0111033 A1 | 4/2018 | Lagree |
| 2018/0117392 A1 | 5/2018 | Lagree |
| 2018/0133532 A1 | 5/2018 | Lagree |
| 2018/0133533 A1 | 5/2018 | Lagree |
| 2018/0133534 A1 | 5/2018 | Lagree |
| 2018/0133542 A1 | 5/2018 | Lagree |
| 2018/0178053 A1 | 6/2018 | Lagree |
| 2018/0193691 A1 | 7/2018 | Lagree |
| 2018/0250551 A1 | 9/2018 | Lagree |
| 2018/0250573 A1 | 9/2018 | Lagree |
| 2018/0272179 A1 | 9/2018 | Lagree |
| 2018/0280782 A1 | 10/2018 | Lagree |
| 2018/0318627 A1 | 11/2018 | Lagree |
| 2018/0318646 A1 | 11/2018 | Lagree |
| 2018/0326252 A1 | 11/2018 | Lagree |
| 2018/0353803 A1 | 12/2018 | Lagree |
| 2018/0361190 A1 | 12/2018 | Lagree |
| 2018/0361197 A1 | 12/2018 | Lagree |
| 2019/0006874 A1* | 1/2019 | Chi .......................... H04B 5/79 |
| 2019/0083842 A1 | 3/2019 | Lagree |
| 2019/0160320 A1 | 5/2019 | Lagree |
| 2019/0160329 A1 | 5/2019 | Lagree |
| 2019/0232105 A1 | 8/2019 | Lagree |
| 2019/0240530 A1 | 8/2019 | Lagree |
| 2019/0247694 A1 | 8/2019 | Lagree |
| 2019/0247705 A1 | 8/2019 | Lagree |
| 2019/0247707 A1 | 8/2019 | Lagree |
| 2019/0255375 A1 | 8/2019 | Lagree |
| 2019/0269961 A1 | 9/2019 | Lagree |
| 2019/0314672 A1 | 10/2019 | Lagree |
| 2019/0358484 A1 | 11/2019 | Lagree |
| 2020/0030657 A1 | 1/2020 | Lagree |
| 2020/0047051 A1 | 2/2020 | Lagree |
| 2020/0054913 A1 | 2/2020 | Lagree |
| 2020/0078630 A1 | 3/2020 | Lagree |
| 2020/0078634 A1 | 3/2020 | Lagree |
| 2020/0155393 A1* | 5/2020 | Lambarth ................ A61G 5/10 |
| 2020/0171337 A1 | 6/2020 | Lagree |
| 2020/0222741 A1 | 7/2020 | Aronson |
| 2021/0069572 A1* | 3/2021 | Lagree ............... A63B 71/0622 |
| 2021/0101048 A1* | 4/2021 | Lagree ................ A63B 21/023 |

* cited by examiner

WIRELESS POWER SYSTEM FOR AN EXERCISE MACHINE

CROSS REFERENCE TO RELATED APPLICATIONS

The present application is a continuation of U.S. application Ser. No. 17/088,883 filed on Nov. 4, 2020 which issues as U.S. Pat. No. 11,456,623 on Sep. 27, 2022. Each of the aforementioned patent applications is herein incorporated by reference in their entirety.

STATEMENT REGARDING FEDERALLY SPONSORED RESEARCH OR DEVELOPMENT

Not applicable to this application.

BACKGROUND

A. Field

Example embodiments in general relate to a wireless power system for an exercise machine for providing electrical power wirelessly to an electrical energy storage device or electrical energy consuming device attached to a movable carriage of an exercise machine.

B. Related Art

Any discussion of the related art throughout the specification should in no way be considered as an admission that such related art is widely known or forms part of common general knowledge in the field.

Modern exercise machines are increasingly incorporating various electrical devices (e.g. display screens, speakers, biometric sensors, power ports) which require electrical power and/or communication signals provided to the electrical devices using wired connections. Examples of wired connections include one or more wires (e.g. insulated wires) and cables (e.g. ribbon cable, power cable, data cable, network cable, etc.).

Providing electrical power to electrical devices on a non-moving component of an exercise machine is done using a wired connection. However, providing electrical power to electrical devices positioned on a moving component (e.g. movable carriage) of the exercise machine has inherent problems. For example, it may be difficult and time consuming for the person assembling the exercise machine to attach the wired connection in the correct locations on the exercise machine during assembly of the exercise machine. As another example, the wired connection may be improperly installed on the exercise machine resulting in damage (e.g. crimped, broken, disconnected) to the wired connection during operation of the exercise machine. As a further example, wired connections are susceptible to damage from the repeated movements of the moving component of the exercise machine. As a further example, wired connections may become loose or dislodge from their attachment locations on the exercise machine.

SUMMARY

An example embodiment is directed to a wireless power system for an exercise machine. The wireless power system for an exercise machine includes an exercise machine which includes a frame having one or more rails. A carriage is movably positioned upon the rails to allow an exerciser to move the carriage when performing an exercise. A wireless power receiver is attached to the carriage that wirelessly receives electrical energy transferred from a wireless power transmitter. An electrical energy storage device or an electrical energy consuming device attached to the movable carriage is electrically connected to the wireless power receiver to receive electrical power from the wireless power receiver.

There has thus been outlined, rather broadly, some of the embodiments of the wireless power system for an exercise machine in order that the detailed description thereof may be better understood, and in order that the present contribution to the art may be better appreciated. There are additional embodiments of the wireless power system for an exercise machine that will be described hereinafter and that will form the subject matter of the claims appended hereto. In this respect, before explaining at least one embodiment of the wireless power system for an exercise machine in detail, it is to be understood that the wireless power system for an exercise machine is not limited in its application to the details of construction or to the arrangements of the components set forth in the following description or illustrated in the drawings. The wireless power system for an exercise machine is capable of other embodiments and of being practiced and carried out in various ways. Also, it is to be understood that the phraseology and terminology employed herein are for the purpose of the description and should not be regarded as limiting.

BRIEF DESCRIPTION OF THE DRAWINGS

Example embodiments will become more fully understood from the detailed description given herein below and the accompanying drawings, wherein like elements are represented by like reference characters, which are given by way of illustration only and thus are not limitative of the example embodiments herein.

DETAILED DESCRIPTION

Figure 1:
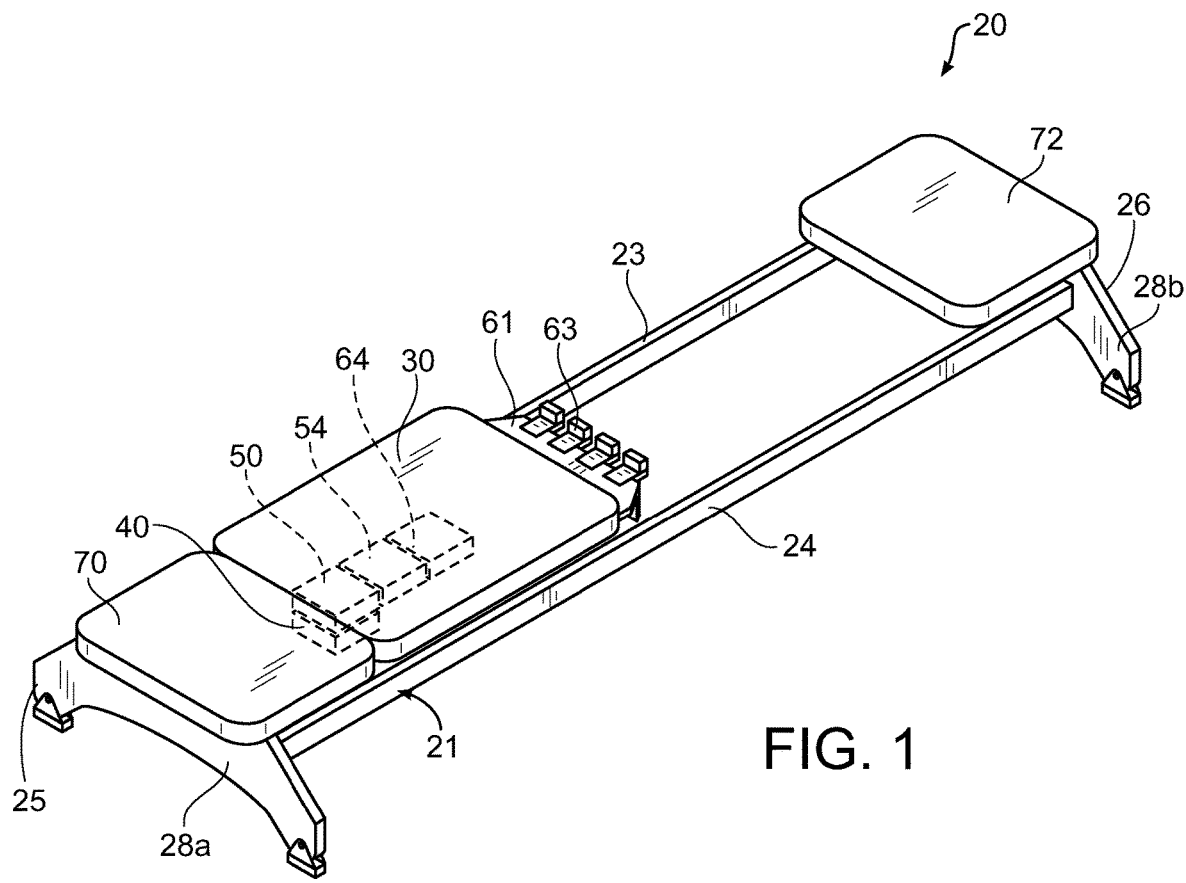
FIG. 1 is a perspective view of a wireless power system for an exercise machine in accordance with an example embodiment.

A. Overview.

An example wireless power system for an exercise machine generally comprises an exercise machine 20 comprising a frame 21 having a first end 25 and a second end 26 opposite of the first end 25, wherein the frame 21 includes at least one rail 23, 24 and a carriage 30 movably positioned upon the at least one rail 23, 24. The carriage 30 is adapted to be movable along a movement path comprising at least a portion of the at least one rail 23, 24. A wireless power receiver 50 is attached to the carriage 30 and a wireless power transmitter 40 is adapted to wirelessly transmit electrical energy to the wireless power receiver 50. One or more electric power storage devices (e.g. rechargeable batteries 54) and/or one or more electrical devices 60 that consume or otherwise use electric power are electrically connected to the wireless power receiver 50 to wirelessly receive electrical power from the wireless power receiver 50. The wireless power receiver 50 is adapted to charge each rechargeable battery 54 and/or provide direct electrical power to each electrical device 60 with electrical energy received from the wireless power transmitter 40.

The wireless power transmitter 40 may be positioned underneath the carriage 30. The wireless power transmitter 40 may be attached to the frame 21. The frame 21 may include a cross bar 29, wherein the wireless power transmitter 40 is attached to the cross bar 29 of the frame 21. An end platform 70 may be connected to the first end 25 of the frame 21, wherein the wireless power transmitter 40 is attached to the end platform 70.

The wireless power receiver 50 may be attached to a lower surface 32 of the carriage 30. A control unit 64 may be electrically connected to the rechargeable battery 54. The control unit 64 may be connected to an electrical device 60. The wireless power transmitter 40 may be positioned along the movement path of the carriage 30. The wireless power transmitter 40 may be positioned near a resting point of the carriage 30. The wireless power transmitter 40 may be positioned underneath the resting point of the carriage 30.

The exercise machine 20 may include a bias member 38 adapted to be connected to the carriage 30, wherein the bias member 38 applies a biasing force against movement of the carriage 30 when connected to the carriage 30. The wireless power transmitter 40 may be adapted to wirelessly transmit electrical energy to the wireless power receiver 50 using near-field transmission. The wireless power transmitter 40 may be adapted to wirelessly transmit electrical energy to the wireless power receiver 50 using a magnetic field such as by inductive coupling or an electrical field such as by capacitive coupling. The wireless power transmitter 40 may comprise a first inductive coil and the wireless power receiver 50 may comprise a second inductive coil. The wireless power transmitter 40 may comprise a first electrode and the wireless power receiver 50 may comprise a second electrode.

The rechargeable battery 54 and/or the electrical devices 60 are electrically connected to the wireless power receiver 50 by a wired connection (e.g. one or more electrical wires, one or more electric power cables) to transfer electrical power from the wireless power receiver 50 to the rechargeable battery 54 and/or the electrical devices 60. One or more electrical devices 60 are electrically connected to the rechargeable battery 54 or the wireless power receiver 50 by a wired connection (e.g. one or more electrical wires, one or more electric power cables). The rechargeable battery 54 or the wireless power receiver 50 provides electrical energy to the electrical device 60 via the wired connection.

The carriage 30 is movable between a first position and a second position, wherein the wireless power transmitter 40 transmits electrical energy to the wireless power receiver 50 when the carriage 30 is in the first position, wherein the wireless power transmitter 40 does not transmit electrical energy to the wireless power receiver 50 when the carriage 30 is not in the first position. The first position may comprise a resting position of the carriage 30. The first position may be near the first end 25 of the frame 21. A resistance selector device 61 may be attached to the carriage 30 for releasably engaging with one or more bias members 38, wherein the resistance selector device 61 is electrically connected to the rechargeable battery 54.

B. Exercise Machine.

1. Overview.

The figures illustrate exemplary exercise machines 20 which may be utilized with the systems and methods described herein. The exercise machine 20 may be comprised of various types of exercise machines such as but not limited to a reformer exercise machine, exercise bicycle, rowing machine and the like. The figures illustrate exemplary embodiments of an exercise machine 20 having a reformer exercise machine configuration, with FIGS. 1 through 8B illustrating a multi-rail reformer exercise machine and FIGS. 9A through 9B illustrating a monorail reformer exercise machine. It should be appreciated that these exemplary embodiments are merely for illustrative purposes, and thus the scope should not be construed as limited to any particular exercise machine configuration shown in the figures.

Figure 2:
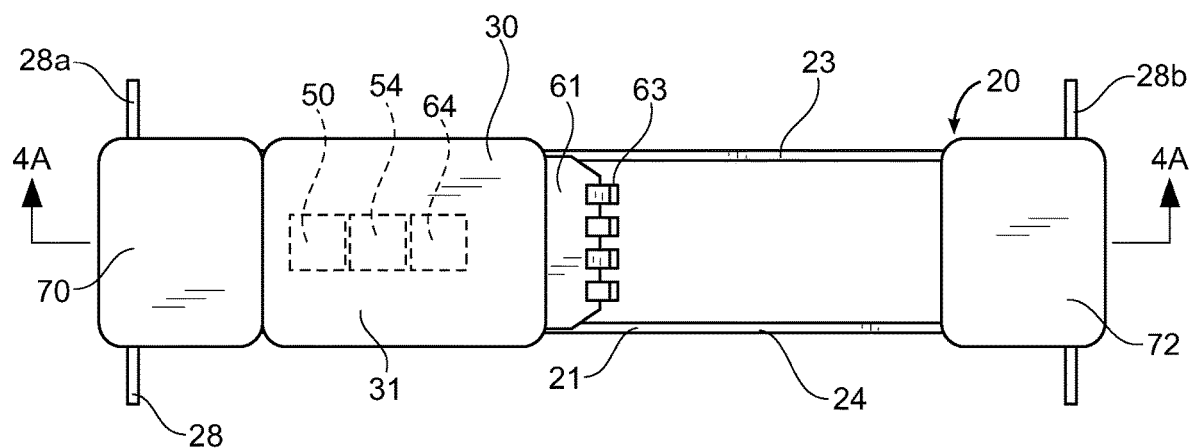
FIG. 2 is a top view of a wireless power system for an exercise machine with the carriage in the charging position in accordance with an example embodiment.

As shown in FIGS. 1 through 9B of the drawings, the exercise machine 20 generally includes a frame 21, a carriage 30 movably positioned upon the frame 21 and one or more bias members 38 selectively connectable to the carriage 30 to provide a biasing force to the carriage 30. The frame 21 generally includes a first end 25, a second end 26 opposite of the first end 25, and one or more rails 23, 24. The number of rails used for the exercise machine 20 may be one rail 23 (e.g. monorail) as shown FIGS. 9A-9B, a pair of parallel rails 23, 24 as shown in FIGS. 1-2, or more than two rails (not illustrated). The one or more rails 23, 24 may or may not extend the entire length of the frame 21. The one or more rails 23, 24 may or may not be parallel with respect to a longitudinal axis of the exercise machine 20.

Figure 3:
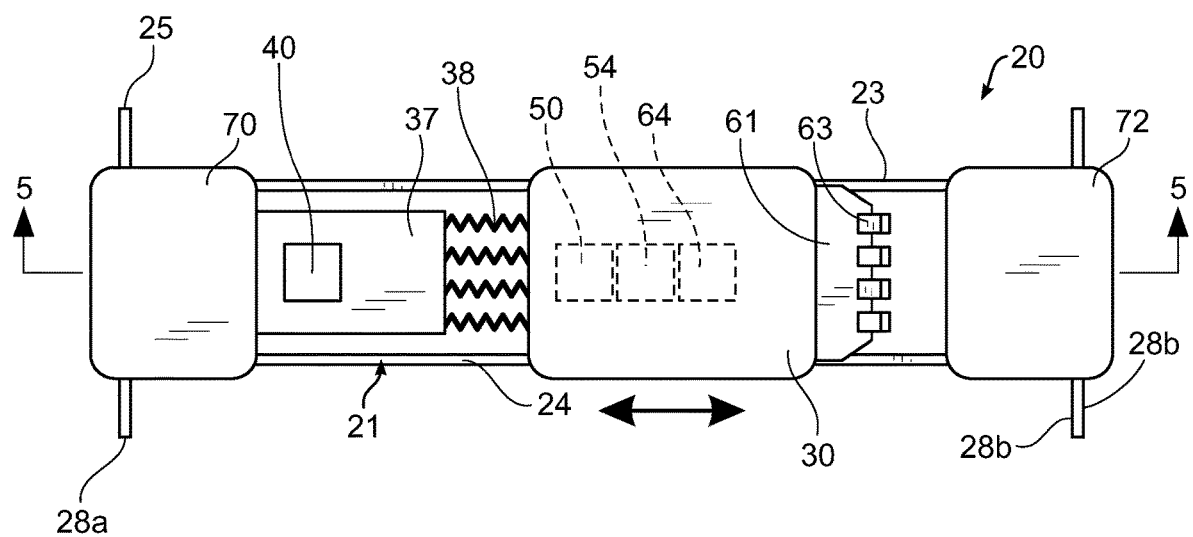
FIG. 3 is a perspective view of a wireless power system for an exercise machine with the carriage having been moved in accordance with an example embodiment.

As shown in FIGS. 1-3, the frame 21 of the exercise machine 20 may include one or more supports 28a, 28b to support the exercise machine 20 above an underlying surface such as a ground surface, the floor, a mat, or the like. While FIGS. 1 through 9B illustrate the supports 28a, 28b attached to or near the first end 25 and the second end 26 of the frame 21 respectively, the supports 28a, 28b may be attached in various other locations of the frame 21. The supports 28a, 28b may extend transverse to the longitudinal axis extending between the respective ends 25, 26 of the frame 21 as shown in the figures. The number of supports 28a, 28b utilized will depend upon the length and configuration of the exercise machine 20, and thus the number of supports 28a, 28b will vary in different embodiments. In some embodiments, discrete supports 28a, 28b may be omitted, with the frame 21 simply resting upon the underlying surface on which the exercise machine 20 is positioned. The shape, size, and structure of the frame 21 may vary in different embodiments, and thus should not be construed as limited by the exemplary figures.

Figure 6A:
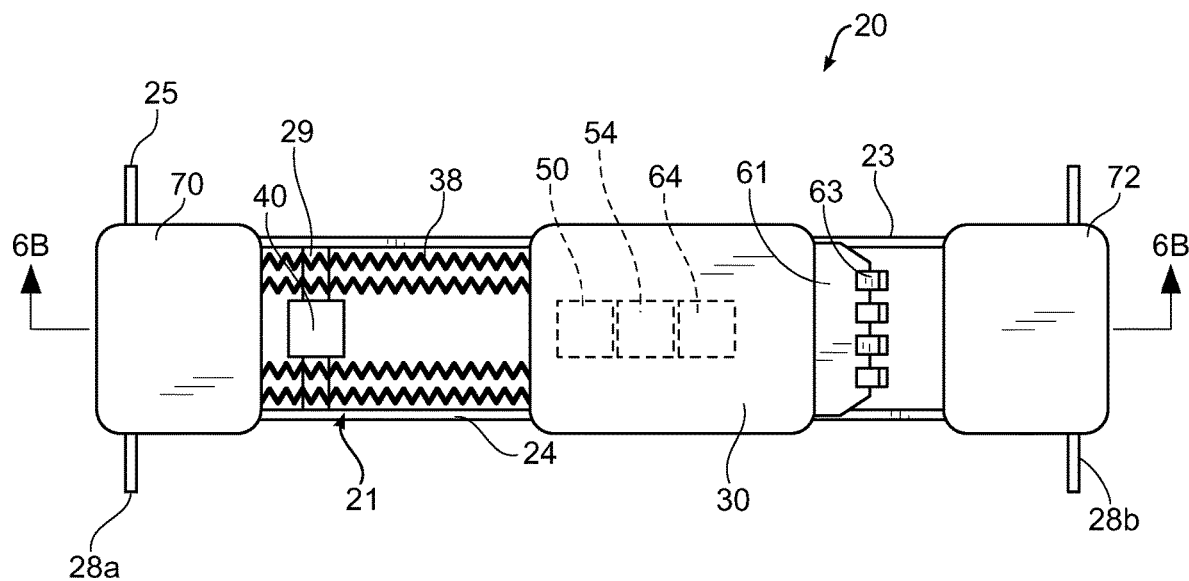
FIG. 6A is a top view of a wireless power system for an exercise machine in which the wireless power transmitter is attached to the frame in accordance with an exemplary embodiment.

As best shown in FIG. 6A, an exemplary embodiment of the frame 21 of the exercise machine 20 may include a cross bar 29 which extends transverse to the longitudinal axis extending along the length of the one or more rails 23, 24. The cross bar 29 will generally be positioned such that the carriage 30 may freely pass over the cross bar 29. The cross bar 29 may be connected to various structural elements of the frame 21 of the exercise machine 20. The cross bar 29 may extend between the parallel rails 23, 24 such as shown in FIG. 6A. As discussed below, the wireless power transmitter 40 may be attached to the cross bar 29 in some embodiments.

2. Movable Carriage.

As shown throughout the figures, the exercise machine 20 generally includes a movable carriage 30 which is movably positioned upon the one or more rails 23, 24 such that the carriage 30 may move along at least a portion of the length of the one or more rails 23, 24. In one embodiment, the carriage 30 moves back and forth along at least a portion of the length of one or more rails 23, 24 in a reciprocating manner. The carriage 30 typically includes a plurality of wheels (not shown) or other movable structure that movably engage the one or more rails 23, 24 of the exercise machine 20. In one embodiment, the carriage 30 is illustrated as comprising an upper surface 31, a lower surface 32, a first end 33, a second end 34, a first side 35, and a second side 36. The carriage 30 may include various handles, cutouts, and the like which an exerciser may grasp or contact with various limbs during the performance of a wide range of exercises.

The shape, size, and configuration of the carriage 30 may vary in different embodiments, and thus should not be construed as limited by the exemplary embodiments shown in the figures. The carriage 30 will generally comprise a substantially-rectangular shape such as shown in the figures, though other shapes may be utilized in different embodiments. The length and width of the carriage 30 may vary depending on the embodiment so as to suit different types of exercisers. A large bodybuilder would benefit from a longer and wider carriage 30 than a more cardio-based exerciser with perhaps a smaller stature. Thus, the dimensions of the carriage 30 shown in the exemplary figures should not be construed as limiting in scope.

U.S. Pat. Nos. 10,155,129, 9,579,555 and 7,803,095 disclose example exercise machines with a movable carriage, the entire disclosures of which, except for any definitions, disclaimers, disavowals, and inconsistencies, are incorporated herein by reference. While the drawings illustrate the carriage 30 being used on a reformer type of exercise machine 20, the carriage 30 may also comprise a movable seat assembly used on a rowing machine. U.S. Pat. No. 4,875,674 discloses an example rowing machine, the entire disclosure of which, except for any definitions, disclaimers, disavowals, and inconsistencies, is incorporated herein by reference.

In other embodiments, the wireless power receiver 50, the battery 54 and electrical device 60 may be attached to a moving component on the exercise machine 20 different from a carriage 30 such as a movable handle on the exercise machine 20 (e.g. movable handle on a reformer machine, exercise bicycle, weight lifting machine).

3. Bias Members.

As shown in the figures, one or more bias members 38 may be removably and selectively connected to the carriage 30 so as to apply a force against the direction of movement of the carriage 30 to resist movement of the carriage 30 in one or more directions. The one or more bias members 38 may also provide a force in the direction of movement of the carriage 30 to assist the movement of the carriage 30 in one or more directions. In some embodiments, the one or more bias members 38 may be permanently affixed to the carriage 30. In other embodiments, each of a plurality of bias members 38 may be removably and selectively attached to the carriage 30 such that a variable level of resistance force may be applied against movement of the carriage 30 upon the one or more rails 23, 24 depending on the number of such bias members 38 attached.

Each bias member 38 may provide a constant force or a variable force to the carriage 30. Each of the bias members 38 may also provide the same force or a different force to the carriage 30. The type of bias member 38 utilized may vary in different embodiments, including but not limited to various types of springs (e.g. compression springs, extension springs, torsion springs, etc.), elastic bands (e.g. rubber bands, resistance bands, resistance tubes). Each of the bias members 38 may alternatively be comprised of a linkage member (e.g. elongated member, cable, rope, arm, etc.) that is connected to and transfers a force from a resistance device such as but not limited to a magnetic resistance device, electromagnetic resistance device, fan-based resistance device, fluid-based resistance device, mechanical resistance device, or direct contact resistance device. The resistance device may provide a constant force, a variable force or a user selected adjustable force that is transferred to the carriage 30.

Figure 4A:
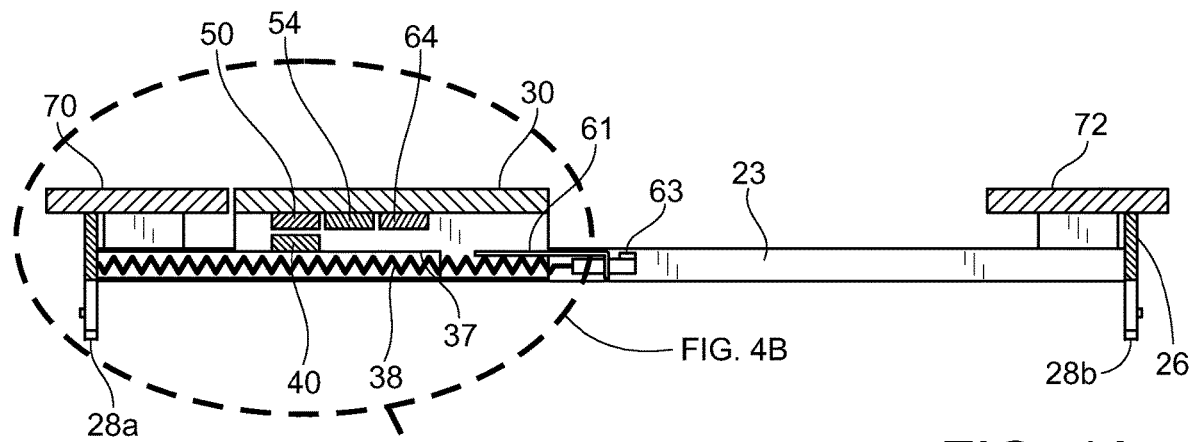
FIG. 4A is a sectional view taken along line 4A-4A of FIG. 2 of a wireless power system for an exercise machine in accordance with an example embodiment.
Figure 4B:
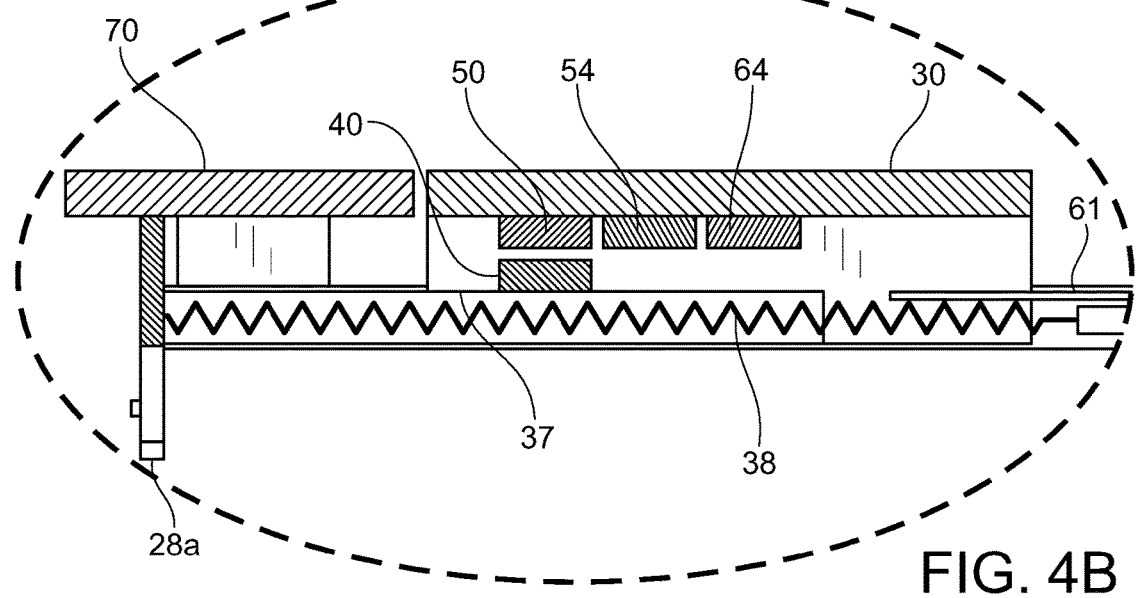
FIG. 4B is a magnified view from FIG. 4A of a wireless power system for an exercise machine in accordance with an example embodiment.
Figure 5:
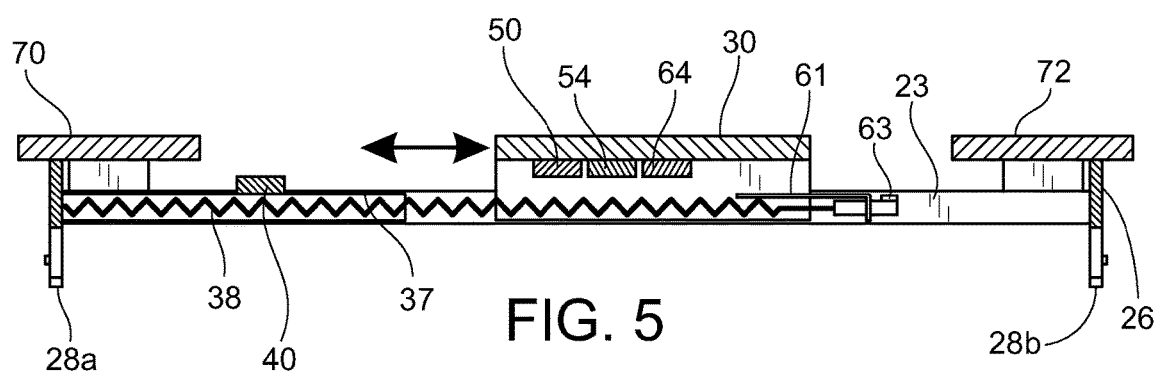
FIG. 5 is a sectional view taken along line 5-5 of FIG. 3 of a wireless power system for an exercise machine with the carriage having been moved in accordance with an example embodiment.

As best shown in FIGS. 3-8B, the exercise machine 20 may include one or more bias members 38 which are connected to the carriage 30 so as to provide a biasing force against movement of the carriage 30 in a certain direction. Generally, one end of each bias member 38 will be anchored, such as by being coupled with the exercise machine 20, such as to a structural element of the frame 21, with the other end of each bias member 38 being removably and selectively coupled to the carriage 30, such as by use of an electrically powered resistance selector device 61 or manually as discussed below.

Where multiple bias members 38 are utilized, one or more of the bias members 38 may be selectively and removably connected to the carriage 30 so as to select a desired level of resistance against movement of the carriage 30 along the one or more rails 23, 24. When not connected to the carriage 30, the bias members 38 may be secured to a bias housing such as a spring box 37 as best shown in FIGS. 3-5. The bias housing may comprise a structure which is connected to the exercise machine 20 and which stores and holds the bias members 38.

In an exemplary embodiment, the bias housing comprises a spring box 37, with the spring box 37 comprising a box configuration which is connected to the frame 21 of the exercise machine 20. The shape, size, and configuration of the spring box 37 may vary in different embodiments. The spring box 37 will generally include at least one opening, such as at an end of the spring box 37 as shown in FIGS. 4A and 4B, through which the bias members 38 extend.

As discussed in more detail below, the spring box 37 may otherwise be enclosed so as to prevent injury, such as from inadvertently placing one's hand within the spring box 37. In some embodiments, the lower end of the spring box 37 may be exposed, with the top, rear, and sides of the spring box 37 being enclosed and the front end of the spring box 37 being exposed such that the bias members 38 may extend outwardly therefrom.

Generally, one end of each bias member 38 will be fixedly secured to the spring box 37. The opposite end of each bias member 38 will be removably connected to carriage 30, such as by use of a resistance selector device 61 as discussed herein. Alternatively, the carriage 30 could include openings, clamps, slots, brackets, magnets, or other types of connectors to which the opposite end of each bias member 38 may be removably and selectively attached.

Various types of spring boxes 37 may be utilized. Generally, the spring box 37 may comprise a frame of structural elements, such as brackets or the like, which partially cover the bias members 38 so as to prevent an exerciser from accidentally coming in contact with the bias members 38 when exercising. In some embodiments, the spring box 37 may comprise an enclosed, box-like structure which stores the bias members 38, with ends of the bias members 38 extending out of the spring box 37 to be selectively removed and connected to the carriage 30. In some embodiments, the bottom of the spring box 37 may be open (and not enclosed) such that the bias members 38 may be easily accessed from underneath the exercise machine as needed for service. The sides of the spring box 37 will generally be covered or enclosed so as to prevent accidental injury to the exerciser when performing exercise moves on the exercise machine 20.

The positioning of the spring box 37 may vary in different embodiments. The spring box 37 will generally be connected to the frame 21 of the exercise machine 20, and positioned between and below the rails 23, 24. The positioning of the spring box 37 along the length of the exercise machine 20 may vary in different embodiments. By way of example, the spring box 37 could be centrally-located between the respective ends 25, 26 of the frame 21 of the exercise machine 20. In another embodiment such as shown in FIG. 4A, the spring box 37 may be positioned near the first end 25 of the frame 21 of the exercise machine 20. In yet another exemplary embodiment, the spring box 37 may be positioned near the second end 26 of the frame 21 of the exercise machine 20. In some embodiments, portions of the spring box 37 may be positioned underneath an end platform 70, 72 of the exercise machine 20. In some embodiments, the spring box 37 may be positioned directly underneath the resting position of the carriage 30.

The manner in which the spring box 37 is connected to the exercise machine 20 may vary in different embodiments. The figures illustrate an embodiment in which the spring box 37 is attached to the frame and positioned between and underneath the rails 23, 24 of the exercise machine 20. The spring box 37 may be connected to the underside of the rails 23, 24 in some embodiments, though in the embodiment shown in the figures, it can be seen that the spring box 37 is not in contact with any of the rails 23, 24. However, in embodiments which utilize a monorail 23, the spring box 37 may be secured or connected to the underside of such a monorail 23. The spring box 37 may be connected to the exercise machine 20 by various methods, such as but not limited to welding, fasteners, clamps, brackets, and the like.

In some embodiments, a spring box 37 may be omitted entirely. In such embodiments, the anchored end of the bias members 38 may instead be connected to various structures of the exercise machine 20. For example, the anchored end of the bias members 38 may be connected to various structural elements of the frame 21 of the exercise machine 20. In some embodiments, the anchored end of the bias members 38 may instead be connected to a separate device or structure from the exercise machine 20, such as a bracket which is positioned on a ground surface or the like.

4. Bias Member Connection System.

The manner by which the bias members 38 are selectively connected to the carriage 30 may vary in different embodiments. For example, the bias members 38 may be selectively connected to the carriage 30 manually by the exerciser, manually connected to the frame 21 of the exercise machine 20 by the exerciser, or connected automatically by an electric powered resistance selector device 61.

In some embodiments, the carriage 30 may include a bracket with openings or other catch structure to which each of the bias members 38 may be selectively attached manually by the user in a removable manner using a connector (e.g. a knob, a hook, clasp, eyelet, etc.) attached to the end of the bias members 38. U.S. Pat. No. 10,155,129 discloses an example bias member selection system, the entire disclosure of which, except for any definitions, disclaimers, disavowals, and inconsistencies, is incorporated herein by reference.

In some embodiments, the bias members 38 may be directly connected to the carriage 30 wherein the bias members 38 each have a distal end including a connector (e.g. a knob, a hook, clasp, eyelet, etc.) that may be selectively attached manually by the user in a removable manner to the frame 21 of the exercise machine 20. U.S. Pat. No. 7,803,095 discloses an example bias member selection system, the entire disclosure of which, except for any definitions, disclaimers, disavowals, and inconsistencies, is incorporated herein by reference.

In some embodiments, the manner by which the bias members 38 are selectively attached to the carriage 30 may utilize an electrically powered and actuated resistance selector device 61 attached to the carriage 30 comprised of actuated connectors 63. U.S. Patent Publication No. 2020/0171337 discloses an example bias member selection system, the entire disclosure of which, except for any definitions, disclaimers, disavowals, and inconsistencies, is incorporated herein by reference.

In some embodiments, the manner by which the bias members 38 are selectively attached to the carriage 30 may utilize an electromagnetic resistance selection system attached to the carriage 30 comprised of magnetic connectors. U.S. Pat. No. 10,478,656 discloses an example bias member selection system, the entire disclosure of which, except for any definitions, disclaimers, disavowals, and inconsistencies, is incorporated herein by reference.

5. End Platforms.

The exercise machine 20 may also include a first end platform 70 attached to the frame 21 at or near the first end 25 of the frame 21 as shown in FIG. 1 of the drawings. The exercise machine 20 may also include a second end platform 72 attached to the frame 21 at or near the second end 26 of the frame 21 as shown in FIG. 1 of the drawings. The exercise machine 20 may not have any end platforms, or the exercise machine 20 may have one end platform 70 or two end platforms 70, 72.

The shape, orientation, size, and positioning of the end platforms 70, 72 may vary in different embodiments. Further, the manner in which the end platforms 70, 72 are connected to the exercise machine 20 may vary. In the exemplary embodiment shown in the figures, the end platforms 70, 72 are illustrated as being connected both to the frame 21 and to the one or more rails 23, 24. In some embodiments, the end platforms 70, 72 may be connected to the frame 21, the one or more rails 23, 24, or to any other structural element of the exercise machine 20. The end supports 28a, 28b may be connected to the end platforms 70, 72, with the first end support 28a being connected to the first end platform 70 and the second end support 28b being connected to the second end platform 72.

C. Wireless Power System.
1. Overview.

As shown throughout the figures, the wireless power system for an exercise machine utilizes a wireless power transmitter 40 which transfers electrical energy to a corresponding wireless power receiver 50, with the wireless power receiver 50 being configured to either directly electrically power one or more electrical devices 60, or to charge a battery 54 which itself powers one or more electrical devices 60. The wireless power receiver 50 is electrically connected to the battery 54 and/or the one or more electrical devices 60 via a wired connection (e.g. one or more wires, one or more cables). The battery 54 is electrically connected to the one or more electrical devices 60 via a wired connection (e.g. one or more wires, one or more cables).

The use of a wireless power transmitter 40 and wireless power receiver 50 permits the use of electrical devices 60 upon the carriage 30 which do not need to be directly powered by a wired connection and which may be easily charged without the need for using any wired connection at all. In such embodiments, the wireless power receiver 50 may be positioned so as to receive electrical energy from the wireless power transmitter 40 when the carriage 30 is in a resting position.

Various types of wireless charging may be utilized by the wireless power transmitter 40 and wireless power receiver 50. By way of example, the wireless power transmitter 40 may utilize near-field transmission to transfer electrical energy to the wireless power receiver 50. Such near-field transfer systems are non-radiative and may utilize resonance to slightly increase the effective distance of transmission of electrical energy. In other embodiments, far-field or radiative transmission may be utilized, which allows for transfer of electrical energy along a greater distance than near-field transmission, but requires the use of various types of radiative energy such as radio waves, microwaves, or light waves.

In the exemplary embodiments shown in the figures, a near-field transfer is utilized. The near-field transfer may rely upon either electric fields or magnetic fields to transfer the electrical energy from the wireless power transmitter 40 to the wireless power receiver 50. By way of example, the near-field transfer may utilize a magnetic field such as through inductive coupling or resonant inductive coupling. Inductive coupling is disclosed in U.S. Pat. No. 9,362,776, covering "Wireless Charging Systems and Methods." U.S. Pat. No. 9,362,776, the entire disclosure of which, except for any definitions, disclaimers, disavowals, and inconsistencies, is incorporated herein by reference. By way of another example, the near-field transfer may utilize an electrical field such as through capacitive coupling or resonant capacitive coupling. Capacitive coupling is discussed in United States Patent Publication No. 2006/0176015, covering a "Portable Electronic Device and Capacitive Charger Therefor and Associated Methods." U.S. Patent Publication No. 2006/0176015, the entire disclosure of which, except for any definitions, disclaimers, disavowals, and inconsistencies, is incorporated herein by reference.

With respect to near-field transfer of electrical energy through use of a magnetic field, inductive coupling may be utilized. In such an embodiment, the wireless power transmitter 40 may comprise a first inductive coil and the wireless power receiver 50 may comprise a second inductive coil, with the respective coils functioning together as a transformer to transfer electrical energy (power) by a magnetic field. An alternating current may be introduced through the first inductive coil of the wireless power transmitter 40 so as to create an oscillating magnetic field. This magnetic field passes through the second inductive coil of the wireless power receiver 50, thus inducing an alternating current in the wireless power receiver 50. This alternating current may be utilized to drive a load (such as an electrical device 60) directly, or may be rectified to direct current which drives the load.

Continuing to reference near-field transfer of electrical energy through use of a magnetic field, resonant inductive coupling may be utilized. In such an embodiment, a pair of resonant circuits is formed: one in the wireless power transmitter 40 and one in the wireless power receiver 50. Each resonant circuit may comprise an inductive coil which is connected to a capacitor, or a self-resonant coil or other resonator with internal capacitance. The two resonant circuits (one in the wireless power transmitter 40 and one in the wireless power receiver 50) are tuned to resonate at the same resonant frequency. The use of resonant inductive coupling may increase the effective charging distance between the wireless power transmitter 40 and the wireless power receiver 50 so as to allow a "mid-range" transfer which is greater than the "short-range" transfer provided by non-resonant inductive coupling.

With respect to near-field transfer of electrical energy through use of an electrical field, capacitive coupling may be utilized. In such an embodiment, the wireless power transmitter 40 may comprise a first electrode (such as a cathode) and the wireless power receiver 50 may comprise a second electrode (such as an anode). The pair of electrodes forms a capacitance for the transfer of power. The types of electrodes utilized may vary in different embodiments, including but not limited to the use of metal plates.

In such an embodiment, the electrode in the wireless power transmitter 40 forms a capacitor with the electrode in the wireless power receiver 50, with the intervening space acting as the dielectric. An alternating voltage is applied to the transmitting electrode of the wireless power transmitter 40, with the oscillating electrical field inducing an alternating potential on the receiving electrode of the wireless power receiver 50 by electrostatic induction. This causes an alternating current to flow to the load (such as a battery 54 or electrical device 60) that may be rectified into a direct current.

Embodiments which utilize capacitive coupling may comprise a transverse (bipolar) configuration or a longitudinal (unipolar) configuration. In the bipolar configuration, the wireless power transmitter 40 may comprise a pair of transmitter electrodes and the wireless power receiver 50 may comprise a pair of receiver electrodes, with the load being connected between the pair of receiver electrodes. The alternating electrical fields will induce opposite phase alternating potentials in the pair of receiver electrodes, which causes current to flow back and forth between the pair of receiver electrodes through the load.

In the unipolar configuration, the wireless power transmitter 40 and the wireless power receiver 50 each have only a single active electrode and either the ground or a passive electrode which serves as the return path for the current. A transmitter oscillator is connected between the active and passive electrodes of the wireless power transmitter 40 and the load is connected between the active and passive electrodes of the wireless power receiver 50. The electrical field produced by the wireless power transmitter 40 induces alternating charge displacement in the load dipole through electrostatic induction, thus transferring electrical energy between the wireless power transmitter 40 and the wireless power receiver 50.

In some embodiments, resonant capacitive coupling may be utilized so as to increase the effective range of the wireless power transmitter 40 in embodiments which utilize capacitive coupling. In other embodiments, far-field transfer may be utilized which rely upon radiation such as visible light from lasers or microwaves from antennas to transfer energy via electromagnetic radiation.

2. Wireless Power Transmitter.

As shown throughout the figures, the wireless power system for an exercise machine may comprise a wireless power transmitter 40 which is adapted to transfer electrical energy from a power source 44 to a wireless power receiver 50. The location, position, and orientation of the wireless power transmitter 40 may vary in different embodiments. Generally, the wireless power transmitter 40 will be positioned along a movement path of the carriage 30 along the one or more rails 23, 24. The positioning of the wireless power transmitter 40 will generally be dependent upon the positioning of the wireless power receiver 50 on the carriage 30.

The wireless power transmitter 40 may be positioned along the movement path of the carriage 30 underneath the carriage 30, such that the carriage 30 passes over or rests over the wireless power transmitter 40. The wireless power transmitter 40 may be positioned along the movement path of the carriage 30 such that either the first side 35 or the second side 36 of the carriage 30 passes or rests adjacently to the wireless power transmitter 40. The wireless power transmitter 40 may also be positioned along the movement path of the carriage 30 such that either the first end 33 or the second end 34 of the carriage 30 passes and/or rests adjacently to the wireless power transmitter 40.

The wireless power transmitter 40 may be attached to various structural, non-movable elements of the exercise machine 20, such as to the frame 21 or to the one or more rails 23, 24. The wireless power transmitter 40 may be positioned underneath the carriage 30 or may be positioned adjacent to the carriage 30. For example, if the wireless power receiver 50 is attached to the lower surface 32 of the carriage 30, the wireless power transmitter 40 may be positioned underneath the carriage 30. If the wireless power receiver 50 is attached to one of the ends 33, 34 or sides 35, 36 of the carriage 30, the wireless power transmitter 40 may be positioned adjacent to the respective end 33, 34 or side 35, 36 of the carriage 30 to which the wireless power receiver 50 is attached.

By way of example, the wireless power transmitter 40 may be attached to one or more of the rails 23, 24. In embodiments in which multiple rails 23, 24 are utilized, the wireless power transmitter 40 may be attached to either of the rails 23, 24. In some embodiments, multiple wireless power transmitters 40 may be utilized, with, for example, a first wireless power transmitter 40 on the first rail 23 and a second wireless power transmitter 40 on the second rail 24.

FIGS. 3-5 illustrate an embodiment in which the wireless power transmitter 40 is positioned on or attached to a spring box 37. The manner in which the wireless power transmitter 40 is secured to the spring box 37 may vary in different embodiments. In some embodiments, the wireless power transmitter 40 may be fixedly attached to the spring box 37. In other embodiments, the wireless power transmitter 40 may be removably attached to the spring box 37. In other embodiments, the wireless power transmitter 40 may simply be positioned upon the spring box 37 without being secured thereto.

The positioning of the wireless power transmitter 40 on the spring box 37 may vary in different embodiments. Preferably, the wireless power transmitter 40 will be positioned upon the spring box 37 in a position which correlates with the resting position of the carriage 30 such that, when the carriage 30 is in the resting position, the wireless power receiver 50 is positioned directly above, or directly adjacent to, the wireless power transmitter 40. Such an embodiment is shown in FIG. 4A.

The positioning of the wireless power transmitter 40 upon the spring box 37 in the exemplary embodiments shown in the figures should not be construed as limiting, as the positioning of the wireless power transmitter 40 will largely be dependent upon the positioning of the wireless power receiver 50 on the carriage 30. The wireless power transmitter 40 could be positioned on the top and/or sides of the spring box 37. The wireless power transmitter 40 may rest entirely upon the spring box 37, or may extend past the outer perimeter of the spring box 37.

Figure 6B:
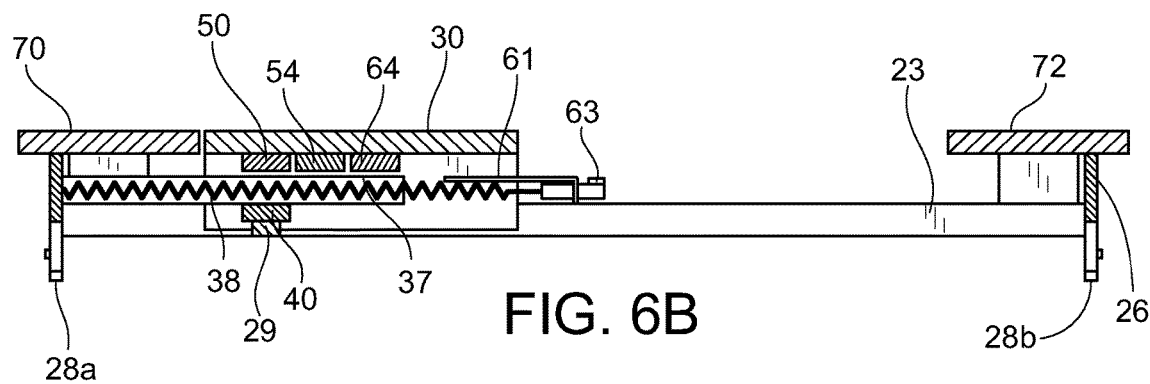
FIG. 6B is a sectional view taken along line 6B-6B of FIG. 6A of a wireless power system for an exercise machine in which the wireless power transmitter is attached to the frame in accordance with an exemplary embodiment.

FIGS. 6A and 6B illustrate an embodiment in which the wireless power transmitter 40 is attached to a structural element of the frame 21. More specifically, FIGS. 6A and 6B illustrate an embodiment in which the wireless power transmitter 40 is attached to a cross bar 29 which extends transverse to the longitudinal axis extending between the ends 25, 26 of the frame 21. The cross bar 29 is illustrated as extending perpendicularly with respect to the rails 23, 24. The wireless power transmitter 40 is shown as being attached to the upper end of the cross bar 29 at the approximate mid-point of the cross bar 29. It should be appreciated that the wireless power transmitter 40 may alternatively be attached to various other locations of the cross bar 29 depending upon the positioning of the wireless power receiver 50 on the carriage 30.

Figure 8A:
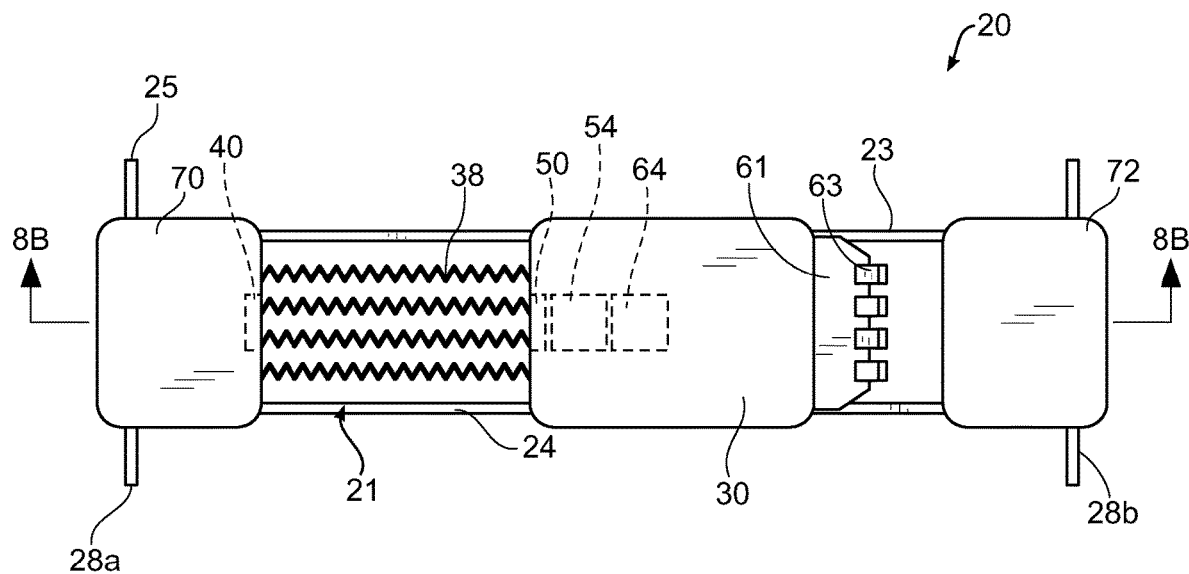
FIG. 8A is a top view of a wireless power system for an exercise machine in which the wireless power transmitter is attached to the end platform in accordance with an exemplary embodiment.
Figure 8B:
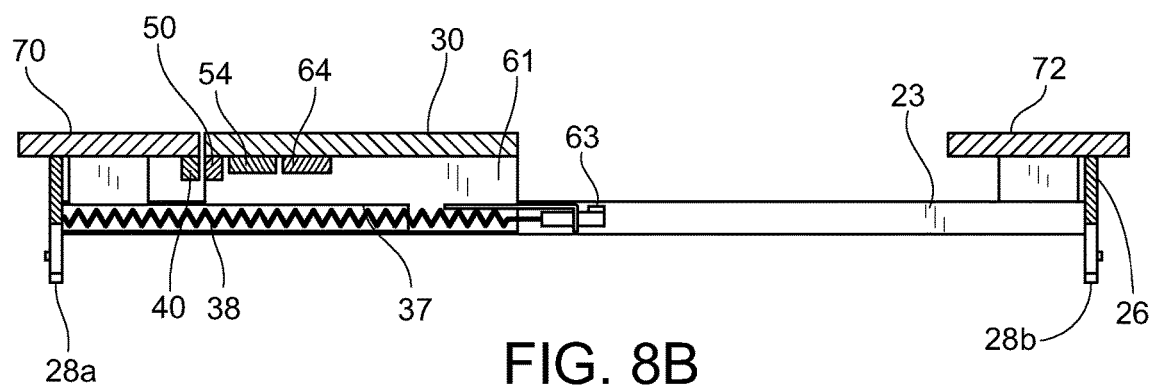
FIG. 8B is a sectional view taken along line 8B-8B of FIG. 8A of a wireless power system for an exercise machine in which the wireless power transmitter is attached to the end platform in accordance with an exemplary embodiment.
Figure 9A:
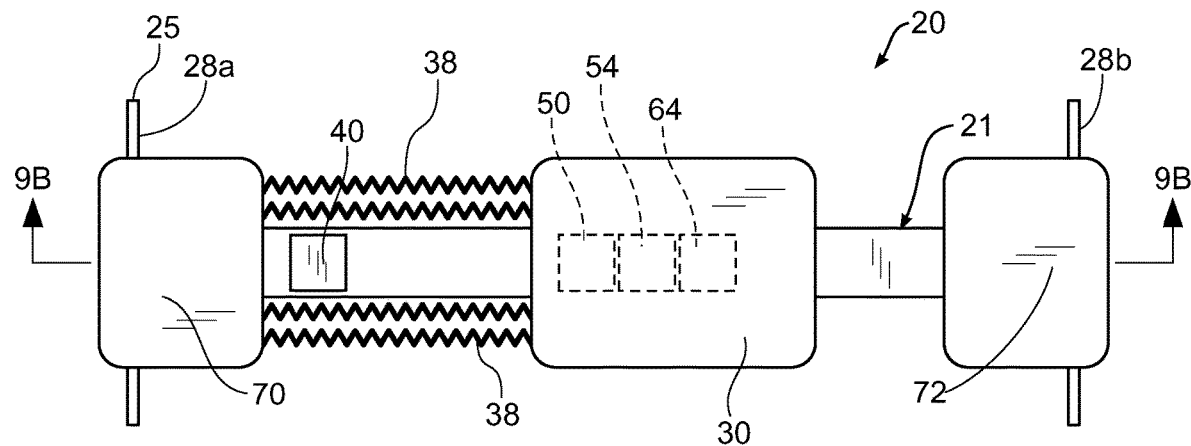
FIG. 9A is a top view of a wireless power system for an exercise machine in which the exercise machine includes a monorail in accordance with an exemplary embodiment.
Figure 9B:
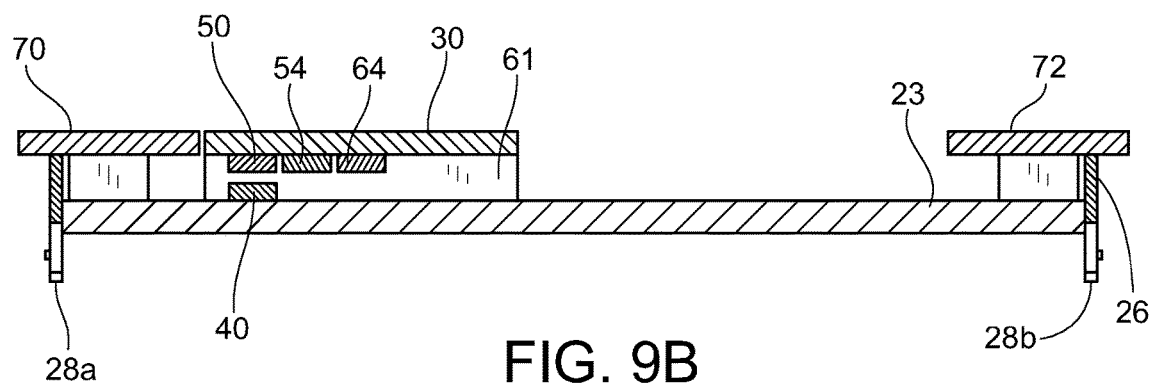
FIG. 9B is a sectional view taken along line 9B-9B of FIG. 9A of a wireless power system for an exercise machine in which the exercise machine includes a monorail in accordance with an exemplary embodiment.

FIGS. 8A and 8B illustrate an embodiment in which the wireless power transmitter 40 is attached to an end platform 70, 72 of the exercise machine 20. More specifically, FIGS. 8A and 8B illustrate an embodiment in which the wireless power transmitter 40 is attached to the first end platform 70 of an exercise machine 20. While not illustrated, it should be appreciated that the wireless power transmitter 40 could alternatively be attached to the second end platform 72 of the exercise machine 20.

The wireless power transmitter 40 may be attached to various positions of the end platform 70, 72. The wireless power transmitter 40 may be attached to the end of the end platform 70, 72 which faces the carriage 30. The wireless power transmitter 40 may be attached to the bottom or the top of the end platform 70, 72. The wireless power transmitter 40 may extend past the outer perimeter of the end platform 70, 72, such as by extending past an end of the end platform 70, 72.

In the exemplary embodiment best shown in FIG. 8B, it can be seen that the wireless power transmitter 40 is oriented vertically at the leading edge of the first end platform 70. Similarly, the wireless power receiver 50 is illustrated as being oriented vertically at the rear edge of the carriage 30. In this type of embodiment, the wireless power transmitter 40 faces the wireless power receiver 50 when the carriage 30 is positioned adjacent to the first end platform 70 as shown in FIG. 8B. It should be appreciated that the orientation of the wireless power transmitter 40 and wireless power receiver 50 may vary and thus should not be construed as limited by the exemplary vertical orientation shown in FIG. 8B.

The manner by which the wireless power transmitter 40 is attached to the frame 21, to one of the end platforms 70, 72, or to the spring box 37 may vary in different embodiments. By way of example and without limitation, the wireless power transmitter 40 may be secured to the frame 21 or the spring box 37 by use of fasteners, adhesives, magnets, clamps, brackets, and the like. In some embodiments, the wireless power transmitter 40 may be integral with the spring box 37. In other embodiments, the wireless power transmitter 40 may be integral with the frame 21.

Figure 7A:
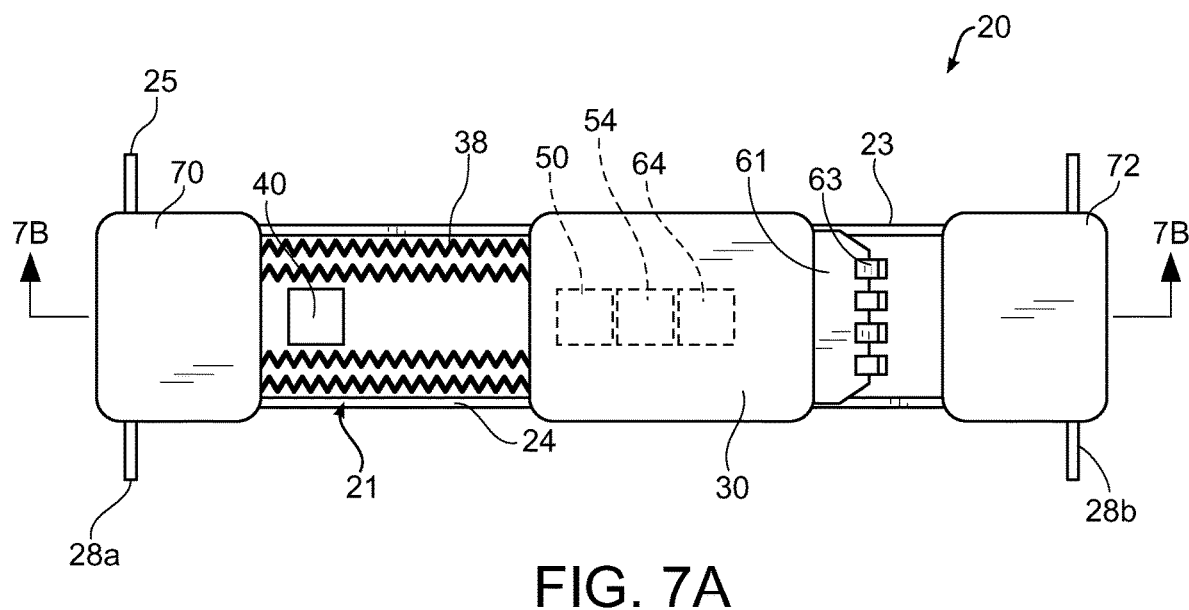
FIG. 7A is a top view of a wireless power system for an exercise machine in which the wireless power transmitter is positioned underneath the exercise machine in accordance with an example embodiment.
Figure 7B:
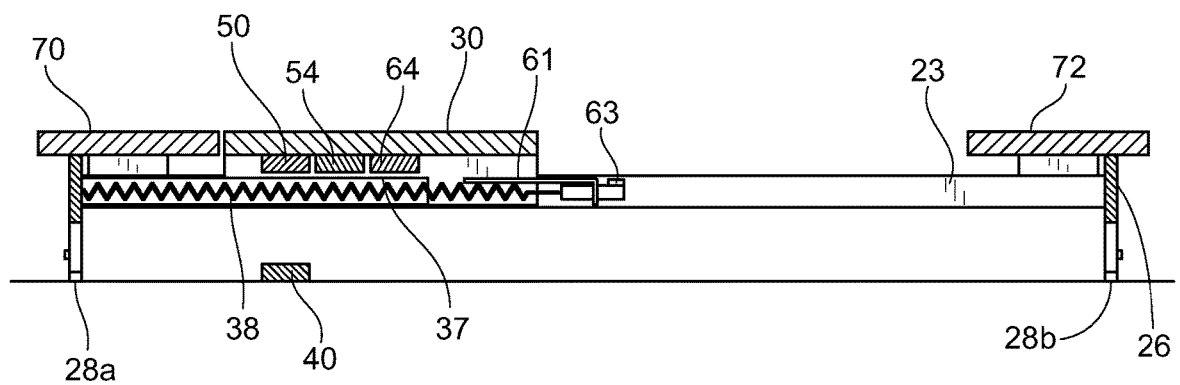
FIG. 7B is a sectional view taken along line 7B-7B of FIG. 7A of a wireless power system for an exercise machine in which the wireless power transmitter is positioned underneath the exercise machine in accordance with an example embodiment.

FIGS. 7A and 7B illustrate an embodiment in which the wireless power transmitter 40 is positioned upon a surface underlying the exercise machine 20. Generally in such embodiments, the wireless power transmitter 40 will be positioned underneath the exercise machine 20 along the movement path of the carriage 30. The wireless power transmitter 40 may rest upon the surface underlying the exercise machine 20 or be secured thereto. In embodiments in which the wireless power transmitter 40 is secured to the surface underlying the exercise machine 20, various methods of attachment may be utilized, such as but not limited to fasteners, adhesives, magnets, clamps, brackets, and the like.

The wireless power transmitter 40 may include or be communicatively connected to a controller. The controller may be operable to control various aspects of the wireless power transmitter 40, such as but not limited to controlling the flow of electrical energy (e.g., voltage, current, etc.) to the wireless power transmitter 40. The controller may be configured to only activate the wireless power transmitter 40 when the wireless power receiver 50 is positioned near the wireless power transmitter 40. The controller may comprise a microcontroller, programmable logic controller (PLC), or various circuitries.

The wireless power transmitter 40 is electrically connected to a power source 44 which provides the wireless power transmitter 40 with electrical energy. The power source 44 may comprise a wall socket. The power source 44 may provide an alternating or a direct current. A rectifier or inverter may be utilized to convert to alternating or direct current. The power source 44 is typically connected to the wireless power transmitter 40 by an electrical conduit such as a cable or wire.

3. Wireless Power Receiver.

As shown throughout the figures, the wireless power system for an exercise machine may comprise a wireless power receiver 50 which is adapted to wirelessly receive electrical energy transferred from the wireless power transmitter 40. The wireless power receiver 50 may be configured to charge a rechargeable battery 54 or to directly power one or more electrical devices 60. In some embodiments, the wireless power receiver 50 may be configured to both charge a battery 54 and power one or more electrical devices 60, either simultaneously or interchangeably.

The type of wireless power receiver 50 will generally be positioned at a location on the carriage 30. The positioning of the wireless power receiver 50 on the carriage 30 may vary in different embodiments, depending upon the positioning of the wireless power transmitter 40. By way of example, the wireless power receiver 50 may be attached to the lower surface 32 of the carriage 30 such as shown in FIGS. 10-13.

In such embodiments, the wireless power receiver 50 may be oriented downwardly so as to face the upwardly-oriented wireless power transmitter 40 which may be positioned underneath the carriage 30, such as by being connected to the frame 21 (including to a cross bar 29 of the frame 21), connected to the spring box 37, or positioned underneath the exercise machine 20.

It should be appreciated that both the positioning and the orientation of the wireless power receiver 50 may vary in different embodiments. Thus, the exemplary embodiments shown in the figures should not be construed as limiting. The positioning and orientation of the wireless power receiver 50 will generally correspond with that of the wireless power transmitter 40. More specifically, the wireless power receiver 50 will generally be positioned at an opposite orientation with respect to the wireless power transmitter 40. For example, if the wireless power transmitter 40 is oriented to face a first direction, the wireless power receiver 50 will be oriented so as to face a second direction which is opposite to the first direction.

The manner by which the wireless power receiver 50 is attached to the carriage 30 may vary in different embodiments. The wireless power receiver 50 may be fixedly or removably attached to the carriage 30. In some embodiments, the wireless power receiver 50 may be integral with the carriage 30. In embodiments in which the wireless power receiver 50 is attached to the carriage 30 (either removably or fixedly), various methods of attachment may be utilized, such as but not limited to the use of fasteners, clamps, clasps, straps, magnets, adhesives, brackets, and the like.

While the figures illustrate that the wireless power receiver 50 is attached to a lower surface 32 of the carriage 30, it should be appreciated that the wireless power receiver 50 may instead be attached to various other locations of the carriage 30. For example, the wireless power receiver 50 may be attached to the first end 33 or the second end 34 of the carriage 30. As a further example, the wireless power receiver 50 may be attached to the first side 35 or the second side 36 of the carriage 30. In some embodiments, the wireless power receiver 50 may be flush with one or more surfaces of the carriage 30. In other embodiments, the wireless power receiver 50 may extend outwardly from one or more surfaces of the carriage 30.

The wireless power receiver 50 may be electrically connected to a rechargeable battery 54 as shown in the figures. The wireless power receiver 50 may be configured to charge the battery 54 so that the battery 54 may power one or more electrical devices 60 on the carriage 30.

The wireless power receiver 50 may be electrically connected to one or more electrical devices 60. The wireless power receiver 50 may in some embodiments be electrically connected to both the battery 54 and one or more electrical devices 60 such that the wireless power receiver 50 may directly power the one or more electrical devices 60 when in the proximity of the wireless power transmitter 40. When not in the proximity of the wireless power transmitter 40, the battery 54 may instead be used to power the one or more electrical devices 60. In this manner, the electrical devices 60 may be powered by either the battery 54 which has been charged by the wireless power receiver 50, or directly by the wireless power receiver 50 itself.

The exemplary embodiments shown in the figures illustrate an embodiment in which the wireless power receiver 50 is attached to the carriage 30 so as to provide power (either directly or indirectly through the battery 54) to one or more electrical devices 60 on the carriage 30. It should be appreciated, however, that the wireless power receiver 50 may instead be attached to various other locations on the exercise machine 20. For example, the wireless power receiver 50 may be attached to one of the end platforms 70, 72 so as to power one or more electrical devices 60 on the respective end platform 70, 72 to which the wireless power receiver 50 is attached.

The wireless power receiver 50 is preferably configured to receive electrical energy from the wireless power transmitter 40 when both the wireless power transmitter 40 and the wireless power receiver 50 are in the same proximity. The wireless power receiver 50 will thus receive electrical energy from the wireless power transmitter 40 when the wireless power transmitter 40 is near and/or facing the wireless power receiver 50. When the wireless power transmitter 40 is a certain distance from the wireless power receiver 50, no electrical energy will be transferred. The distance of effectiveness will vary depending upon the type of wireless charging utilized.

The wireless power receiver 50 is generally directly electrically connected to a battery 54. The battery 54 may be connected to the wireless power receiver 50 by a wired connection using one or more electrical conduits. In some embodiments, the battery 54 and wireless power receiver 50 may share the same housing. In some embodiments, the battery 54 and wireless power receiver 50 may be integral.

The wireless power receiver 50 may also be directly or indirectly electrically connected to one or more electrical devices 60. Any electrical connection to one or more electrical devices 60 may be in addition to, or in the alternative to, connection to the battery 54. In other words, the wireless power receiver 50 may be electrically connected to both the battery 54 and one or more electrical devices 60, or may be electrically connected only to the battery 54. Electrical energy from the wireless power receiver 50 may thus be transferred to the battery 54 to charge the battery 54 and/or to the electrical devices 60 to power the electrical devices 60.

D. Rechargeable Battery.

At least one electrical energy storage device (e.g. rechargeable electric battery 54) is attached to a movable component (e.g. carriage 30, movable handle) of the exercise machine 20. The battery 54 may be attached to the carriage 30 in various exterior locations of the carriage 30 (e.g. lower surface 32, upper surface 31, at a first end 33 of the carriage 30, at a second end 34 of the carriage 30, etc.) or an interior location of the carriage 30.

The battery 54 may be an electric rechargeable battery or other battery capable of receiving, storing and transferring electrical energy such as but not limited to lead-acid, nickel-cadmium, nick-iron, nickel-metal hydride, lithium-ion, and lithium-ion polymer batteries. The battery 54 may be configured to store electrical energy for use on-demand by one or more electrical devices 60.

Although the figures illustrate only a single battery 54, it should be appreciated that multiple batteries 54 may be utilized either to provide redundancy in the event of failure of one or more batteries 54, or to increase the electrical energy which may be stored for use by the electrical devices 60.

E. Electrical Devices.

At least one electrical energy consuming device is attached to a movable component (e.g. carriage 30, movable handle) of the exercise machine 20. One or more electrical devices 60 are attached to the same movable component (e.g. movable carriage 30, movable handle) as the wireless power receiver 50 is attached such that the electrical devices 60 may be connected by a wired connection to the wireless power receiver 50 and/or to the battery 54 which is charged by the wireless power receiver 50.

The figures and description herein discuss a number of exemplary types of electrical devices 60. Such discussions are not meant to be limiting, but instead are merely for exemplary purposes. Thus, it should be appreciated that a wide range of electrical devices 60 may be supported, and the types of electrical devices 60 being supported should not be construed as limited by the exemplary embodiments shown in the figures. Further, the number of electrical devices 60 supported by the wireless power system for an exercise machine may vary. In some embodiments, only a single electrical device 60 may be supported. In other embodiments, numerous electrical devices 60 may be supported.

Figure 17:
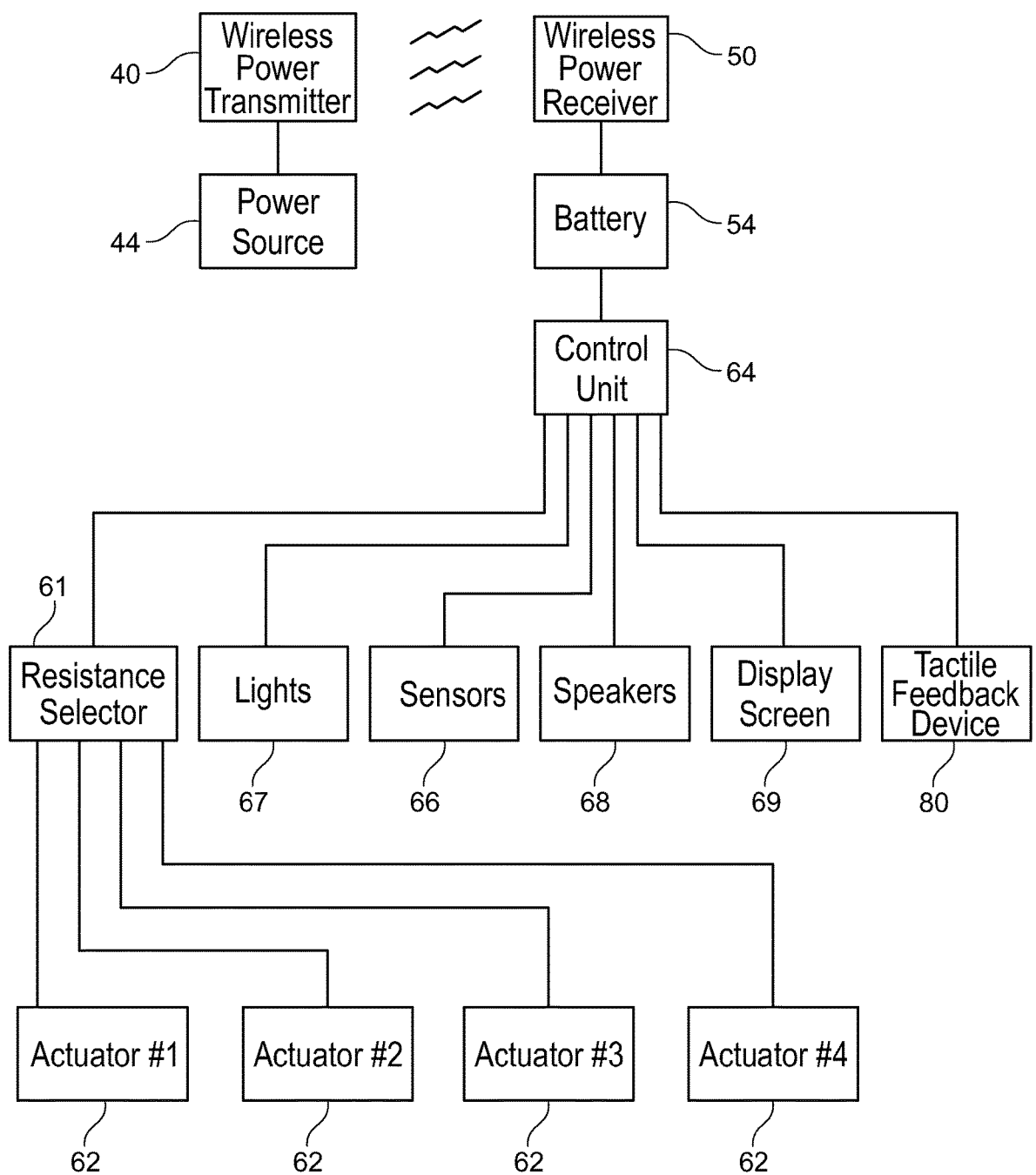
FIG. 17 is a block diagram illustrating a wireless power system for an exercise machine including a battery, control unit, and multiple electrical devices in accordance with an example embodiment.

In some embodiments, the system may utilize a primary electrical device 60 which is connected to the battery 54 and one or more secondary electrical devices 60 which are connected to the primary electrical device 60. By way of example, the primary electrical device 60 may comprise a control unit 64, and the secondary electrical device(s) 60 may comprise various types of electrical devices which are connected to the control unit 64 such that the secondary electrical device(s) 60 are at least partially controlled by the control unit 64. By way of example, the primary electrical device 60 could comprise a control unit 64 and the secondary electrical device 60 could comprise a light 67, with the light 67 being powered and controlled by the control unit 64. FIG. 17 illustrates an embodiment in which the primary electrical device 60 comprises a control unit 64 connected to the battery 54, and the secondary electrical devices 60 comprise a resistance selector device 61, biometric sensors 66, lights 67, speakers 68, and a display screen 69 which are each connected to the primary electrical device 60.

As shown in the figures, the electrical devices 60 may include a control unit 64 which controls various functionalities of the electrical devices 60. The control unit 64 may be electrically connected to and powered by the wireless power receiver 50 and/or the battery 54. The control unit 64 may comprise various types of controllers, including but not limited to microcontrollers, programmable logic controllers (PLC), or various circuitries. The control unit 64 may be configured to control various aspects of any electrical devices 60 utilized. For example, the control unit 64 may control the flow of electrical energy to the electrical devices 60. As a further example, the control unit 64 may directly control the electrical devices 60. For example, if an electrical device 60 comprised of a light 67 is utilized, the control unit 64 may be configured to control when the light 67 is activated or deactivated. As a further example, the control unit 64 could control various other aspects of the electrical device 60, such as the intensity of a light 67.

In some embodiments, the electrical devices 60 may each include their own respective control unit 64, or may be controlled wirelessly. For example, if the electrical devices 60 include a speaker 68, the speaker 68 may be controlled remotely by a mobile device such as a phone which functions as a control unit 64 for the speaker 68. In such embodiments, the mobile device may be connected to the speaker 68 by various methods, such as but not limited to the use of Bluetooth, such that the speaker 68 may be controlled by the mobile device. In another embodiment, the electrical device 60 may be comprised of one or more tactile feedback devices 80 that are attached to the carriage 30 to provide tactile feedback to the exerciser during the performance of an exercise.

In some embodiments, the control unit 64 may comprise a wireless controller such as a remote control. For example, in embodiments in which the electrical devices 60 includes a resistance selector device 61, a separate remote control may function as a control unit 64 by which the various actuators 62 of the resistance selector device 61 may be individually controlled remotely by the exerciser or by an instructor.

Thus, it should be appreciated that the manner by which the electrical devices 60 are controlled may vary in different embodiments. A control unit 64 may be directly connected by a wired connection to the electrical devices 60, in which case the control unit 64 may be attached to the carriage 30 at various locations. The positioning of the control unit 64 may thus vary, and should not be construed as limited by the positioning shown in the exemplary embodiments illustrated in the figures.

In an exemplary embodiment as shown in FIGS. 10-13, the control unit 64 may be attached to the carriage 30 adjacent to the wireless power receiver 50 and/or battery 54. Although not shown, the control unit 64 may also be attached to the carriage 30 but distally-spaced with respect to the wireless power receiver 50. For example, the control unit 64 could be attached to the upper surface 31 of the carriage 30 while the wireless power receiver 50 is attached to the lower surface 32 of the carriage 30.

The control unit 64 may be communicatively connected to one or more electrical devices 60 either by a wired connection, or wirelessly. In the figures, it can be seen that the control unit 64 is illustrated as being connected to a plurality of actuators 62 of a resistance selector device 61 by a wired connection. It should be appreciated, however, that the control unit 64 could instead be wirelessly connected to any electrical devices 60 such as actuators 62 of a resistance selector device 61. As previously mentioned, in some embodiments each of the electrical devices 60 may include its own control unit 64, with the control unit 64 being integral with each electrical device 60 in some embodiments.

A wide range of types of electrical devices 60 may be powered by the wireless power system for an exercise machine. What follows is merely an exemplary description of exemplary embodiments of electrical devices 60 that is not intended to be limiting in scope in any manner. In the exemplary figures, electrical devices 60 may include a resistance selector 61, a control unit 64, various types of sensors 66, lights 67, speakers 68, and/or displays 69. While numerous types of electrical devices 60 are discussed and described herein, it should be appreciated that many other types of electrical devices 60 that are not explicitly discussed herein may similarly be supported by the wireless power system for an exercise machine.

FIGS. 1-8B illustrate an embodiment in which the wireless power system for an exercise machine includes an electrical device 60 comprised of a resistance selector device 61. The resistance selector device 61 may be utilized to selectively and removably attach one or more bias members 38 to the carriage 30 so as to impart a resistance force against movement of the carriage 30. The resistance selector device 61 may be directly powered by the wireless power receiver 50 with electrical energy received from the wireless power transmitter 40. Additionally or alternatively, the resistance selector device 61 may be powered by the battery 54, with the battery 54 being charged by the wireless power receiver 50.

Figure 10:
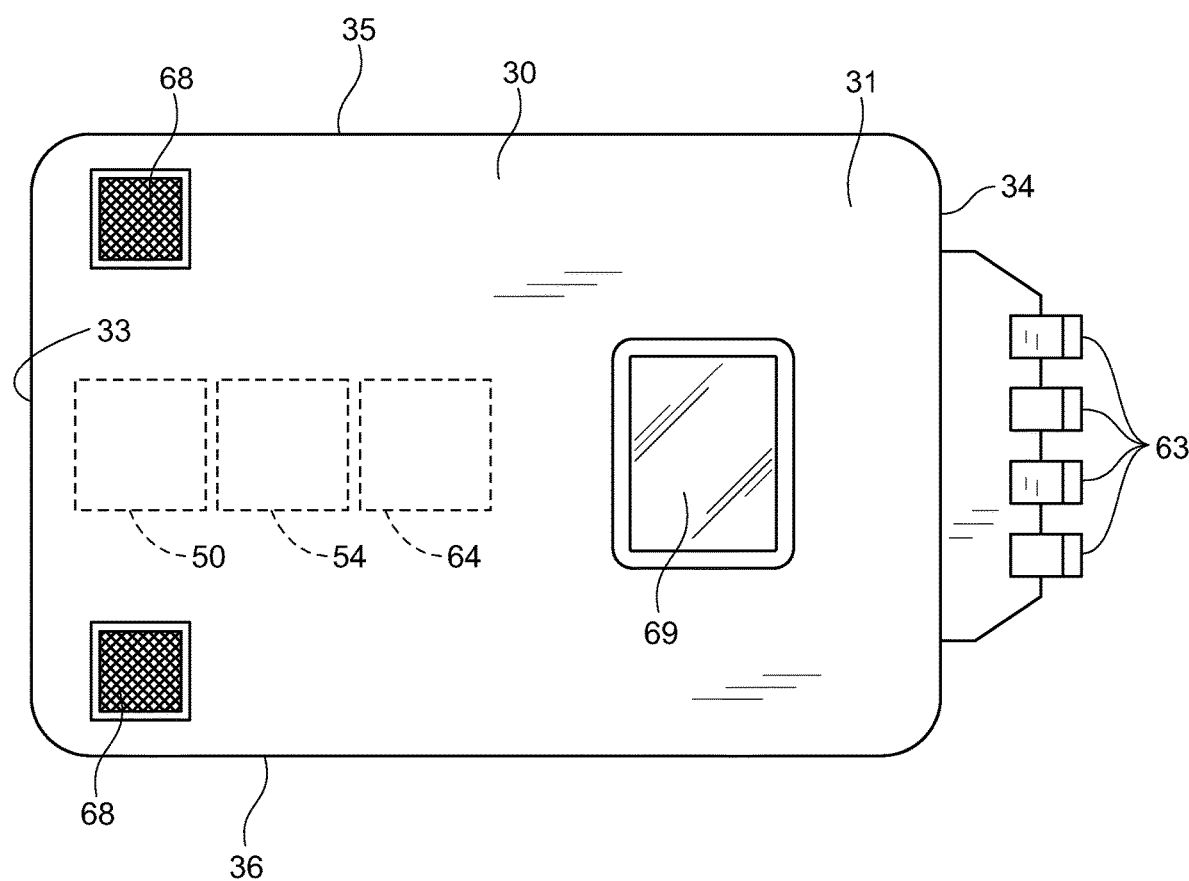
FIG. 10 is a top view of a carriage of a wireless power system for an exercise machine which includes a display and speakers in accordance with an example embodiment.
Figure 11:
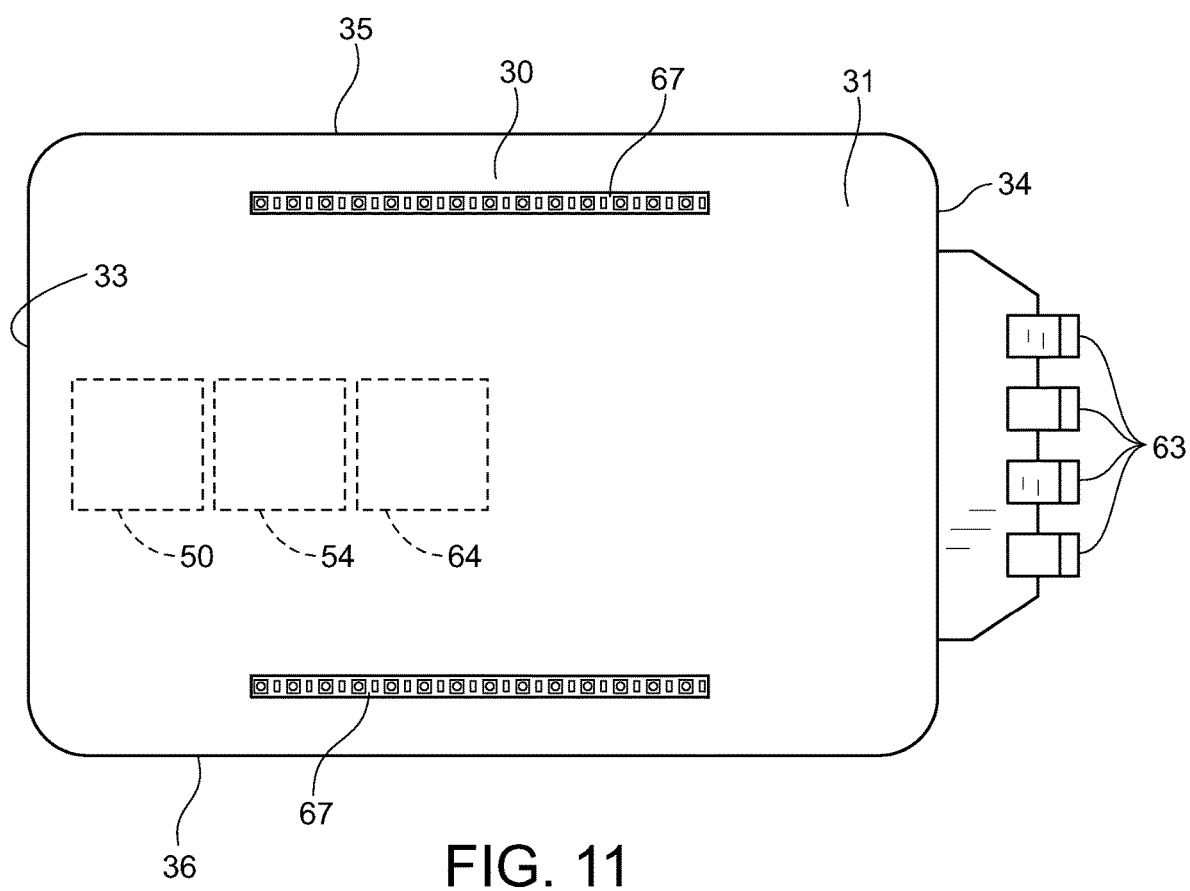
FIG. 11 is a top view of a carriage of a wireless power system for an exercise machine which includes lights in accordance with an example embodiment.
Figure 12:
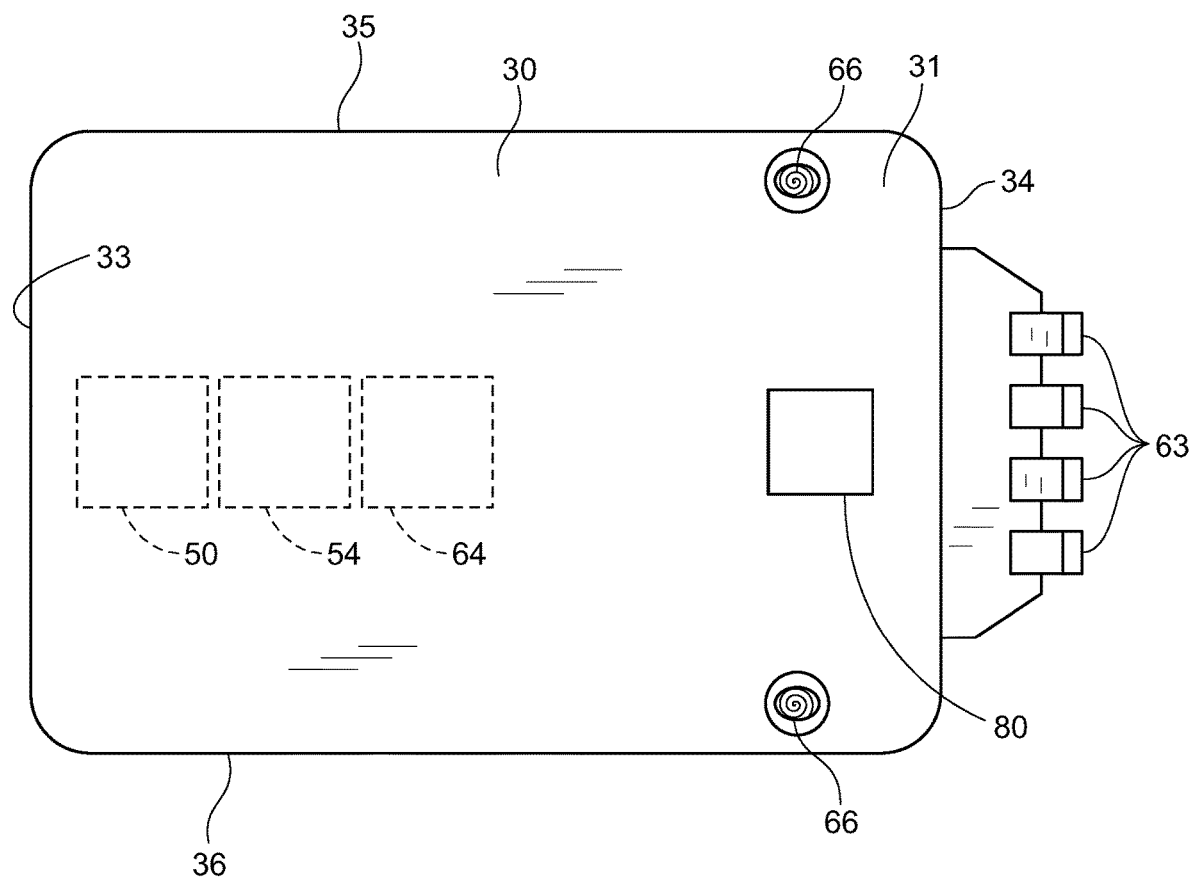
FIG. 12 is a top view of a carriage of a wireless power system for an exercise machine which includes sensors and a tactile feedback device in accordance with an example embodiment.

FIGS. 10-12 illustrate exemplary embodiments of a carriage 30. Each of the figures illustrate a different set of exemplary electrical devices 60 which are connected to the carriage 30 and powered by the wireless power receiver 50 and/or battery 54. FIGS. 1-8B and 10-13 illustrate an embodiment which includes a resistance selector device 61 including a plurality of electrical actuators 62; with the actuators 62 being utilized to selectively engage or disengage one or more bias members 38 to/from the carriage 30. FIG. 10 illustrates an embodiment of the carriage 30 which includes a pair of speakers 68 and a display 69. FIG. 11 illustrates an embodiment of the carriage 30 which includes lights 67. FIG. 12 illustrates an embodiment of the carriage 30 which includes one or more sensors 66 such as a biometric sensor.

Figure 13:
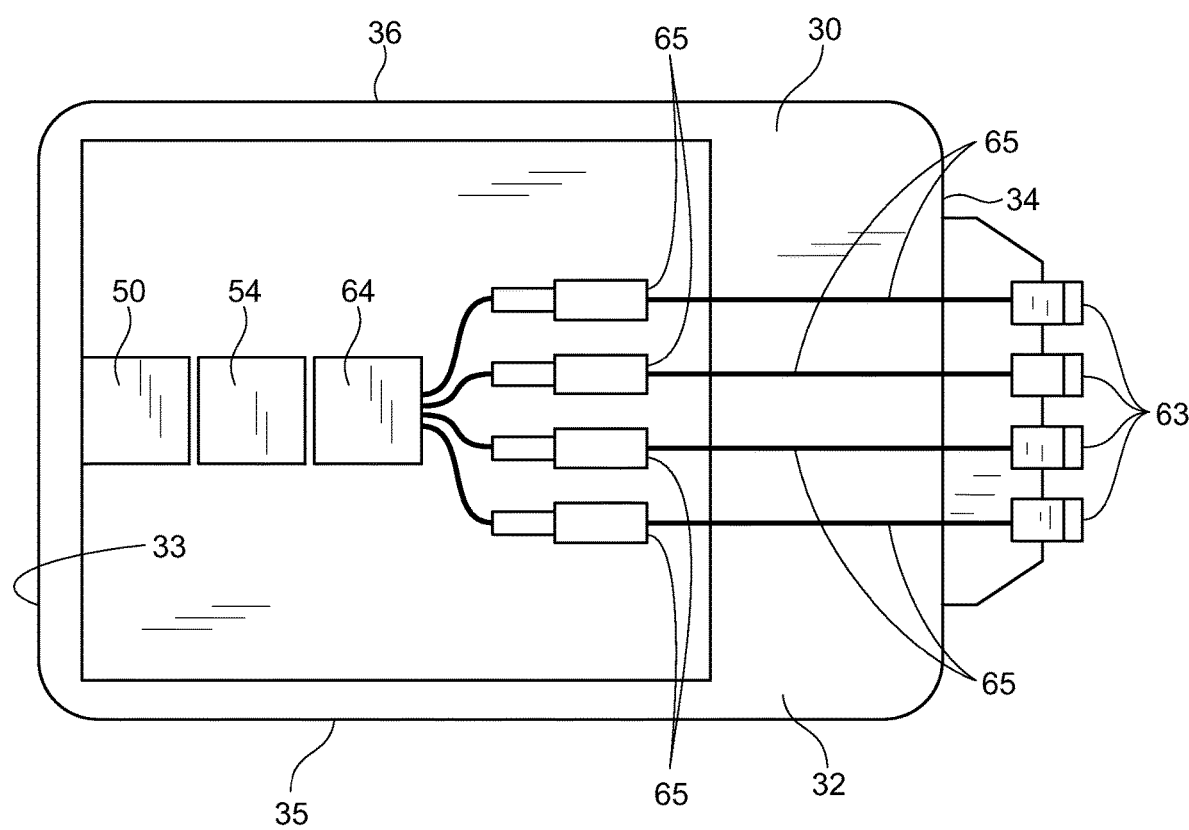
FIG. 13 is a bottom view of a carriage of a wireless power system for an exercise machine in accordance with an example embodiment.

FIG. 13 illustrates a resistance selector device 61 attached to the lower surface 32 of a carriage 30. As shown, it can be seen that the resistance selector device 61 comprises a plurality of actuators 62, each of the actuators 62 being connected to a connector 63 by a linkage 65 such as a rod. As each actuator 62 is extended, a corresponding connector 63 will be adjusted to engage with a corresponding bias member 38, such as from within a spring box 37. Any such bias members 38 which are engaged by the connector 63 will be secured against the carriage 30 so as to impart a resistance force against movement of the carriage 30. Retraction of any such actuators 62 will function to disengage any corresponding connectors 63 from any bias members 38, thus releasing the bias member 38 from the carriage 30 to remove the resistance force imparted against movement of the carriage 30.

As shown in FIG. 13, the actuators 62 may be electrically-powered by the battery 54, or directly by the wireless power receiver 50. A control unit 64 may be connected to the actuators 62 so as to control operation of the actuators 62. In some embodiments, a wireless controller such as a remote control may be utilized to individually control each actuator 62, with each actuator 62 corresponding to a bias member 38 that may be selectively connected to, or disconnected from, engagement with the carriage 30.

As shown in FIG. 10, the electrical devices 60 may comprise one or more speakers 68 which are connected to the carriage 30. The type of speakers 68 utilized may vary in different embodiments. Further, the number of speakers 68 may vary in different embodiments. FIG. 10 illustrates a pair of speakers 68 being utilized, but more or less speakers 68 may be utilized in different embodiments. The positioning of the speakers 68 may also vary and thus should not be construed as limited by the exemplary embodiment shown in the figures. The speakers 68 may be directly powered by the wireless power receiver 50 and/or may be powered by the battery 54.

The speakers 68 may be utilized for a wide range of functions. For example, the speakers 68 may be utilized to play music for the exerciser. As another example, an exercise instructor may provide instructions which are audible from the speakers 68 for the exerciser. The speakers 68 may be controlled by a control unit 64 which is itself attached to the carriage 30. Alternatively, the speakers 68 may be controlled by a remote control, such as a mobile device using Bluetooth.

Continuing to reference FIG. 10, it can be seen that the electrical devices 60 may also comprise a display 69 such as a screen. The type of display 69 utilized may vary in different embodiments. The display 69 may comprise, for example and without limitation, an LED or LCD screen. The display 69 may comprise a touch-screen so that an exerciser may enter inputs via the display 69. The display 69 may be directly powered by the wireless power receiver 50 and/or may be powered by the battery 54.

The positioning and number of displays 69 utilized may vary in different embodiments. Thus, the positioning of the display 69 in FIG. 10 should not be construed as limiting in scope as it is merely an exemplary embodiment. In some embodiments, multiple displays 69 may be utilized. The display 69 may be flush with the upper surface 31 of the carriage 30, or it may extend outwardly or inwardly with respect to the carriage 30 (e.g., the display 69 could be depressed within the carriage 30).

The display 69 may be utilized for a wide range of functions. For example, the display 69 may be utilized to play music or movies to entertain the exerciser while performing exercises. As a further example, instructional or training videos may be displayed upon the display 69. In some embodiments, the display 69 may display one or more exercises for the exerciser to perform while using the exercise machine 20.

The display 69 may be communicatively connected to a control unit 64 which is attached to the carriage 30 such as shown in the figures. Alternatively, the display 69 may receive instructions from a remote control such as a mobile device. In some embodiments, a control unit 64 may be integrated with the display 69.

As shown in FIG. 11, the electrical devices 60 may comprise one or more lights 67 positioned upon or attached to the carriage 30. The type of lights 67 utilized may vary in different embodiments. By way of example and without limitation, one or more lights 67 may comprise various lighting devices, illumination devices, lamps, light-emitting-diodes (LED's), liquid crystal displays (LCD's), light ropes, projection devices, holographic generators, linear lighting, visual display, fluorescent lights, rope lights such as but not limited to LED rope lights, light strips such as but not limited to LED light strips, LCD displays, display screens (elongated or non-elongated), a series of lights (e.g., LED, LCD, incandescent, halogen, compact fluorescent lamps (FCL), neon), and the like.

Continuing to reference FIG. 11, it should be appreciated that the number of lights 67 may vary in different embodiments. FIG. 11 illustrates a pair of lighting strips such as light ropes which are positioned on either side of the carriage 30. Such an embodiment is merely for exemplary purposes, and thus should not be construed as limiting in scope. More or less lights 67 may be utilized. Further, the positioning of the lights 67 may vary. One or more lights 67 may be positioned anywhere on the carriage 30, including on its upper surface 31, lower surface 32, first end 33, second end 34, first side 35, and/or second side 36.

The lights 67 may be directly powered by the wireless power receiver 50 and/or may be powered by the battery 54. The lights 67 may be controlled by a control unit 64 which is attached to the carriage 30, or may be wirelessly controlled by a remote control such as a mobile device. In some embodiments, the lights 67 may be automated, such as, for example, by activating upon movement of the carriage 30. The lights 67 may pulse, blink, chase, or perform various other types of illumination movements.

Any lights 67 utilized may perform a variety of functions. For example, the lights 67 could be utilized to illuminate the carriage 30 in low-light conditions. As another example, the lights 67 could be utilized to provide exercise instructions (e.g., the lights 67 could be green when the exerciser should move the carriage 30 and red when the exerciser should stop the carriage 30). The lights 67 could be comprised of chasing lights which indicate an ideal speed of movement for the carriage 30 during a particular exercise.

As shown in FIG. 12, the electrical devices 60 may comprise one or more sensors 66 positioned upon the carriage 30. Various types of sensors 66 may be utilized, such as but not limited to biometric sensors, health sensors (such as oxygen saturation, heart rate, heart rate variability, body temperature, moisture, and the like), velocity sensors, acceleration sensors, position sensors, or various other types of sensors.

The positioning and orientation of any sensors 66 utilized may vary in different embodiments. FIG. 12 illustrates a pair of biometric sensors 66 which are positioned near the respective sides 35, 36 of the carriage 30. It should be appreciated that more or less sensors 66 may be utilized in different embodiments. Further, the positioning of the sensors 66 may vary. While the figures illustrate sensors 66 being positioned on the upper surface 31 of the carriage 30, one or more sensors 66 may instead be connected to the lower surface 32, first end 33, second end 34, first side 35, and/or second side 36 of the carriage 30. If the carriage 30 includes handles, the one or more sensors 66 may be connected to one or more of the handles.

The sensors 66 may be directly powered by the wireless power receiver 50 and/or may be powered by the battery 54 which is itself charged by the wireless power receiver 50. The sensors 66 may be controlled by a control unit 64 which is attached to the carriage 30, or may be controlled by a remote control such as a mobile device. Data from the sensors 66 may be displayed at various locations, including on a display 69 of the carriage 30 if included, or on a mobile device such as a smart phone.

The electrical device 60 may be comprised of various other types of electrically powered devices such as but not limited to an electric motors, electric actuators, wireless communication devices and electric power ports (e.g. USB port). While a number of exemplary types of electrical devices 60 have been disclosed on the preceding pages, it should be appreciated that the listing of exemplary electrical devices 60 is merely for illustrative purposes. A wide range of electrical devices 60 may be utilized, including any device which relies upon electrical energy to operate and function. Thus, the scope should not be construed as limited by the exemplary listing of electrical devices 60 described herein and shown in the figures.

F. Operation of Preferred Embodiment.

In use, the wireless power transmitter 40 is first electrically connected to a power source 44 so as to receive electrical energy to transmit. Various types of power sources 44 may be utilized to provide power to the wireless power transmitter 40, such as a wall socket, generator, or batteries. The wireless power transmitter 40 is thus generally electrically connected to the power source 44 by one or more electrical conduits such as wires.

With the wireless power transmitter 40 electrically connected to a power source 44, it is then ready to transfer electrical energy to the wireless power receiver 50. Generally, the wireless power transmitter 40 will transfer electrical energy to the wireless power receiver 50 when the wireless power receiver 50 is in a position adjacent to or near the wireless power transmitter 40. The requisite distance between the wireless power transmitter 40 and the wireless power receiver 50 for transfer of electrical energy will vary depending upon the type of wireless charging utilized (e.g., far-field or near-field, inductive or capacitive, resonant or non-resonant, etc.). In some embodiments, the wireless power transmitter 40 will need to be directly adjacent to the wireless power receiver 50, while in other embodiments more distance may be permitted. It should be appreciated that the efficiency of transfer may be greater when the wireless power transmitter 40 is closer to the wireless power receiver 50, with efficiency dropping as the distance between the two components increases.

FIGS. 4A and 4B illustrate a wireless power receiver 50 being positioned directly on top of a corresponding wireless power transmitter 40 such that the wireless power receiver 50 is in range of the wireless power transmitter 40. In such a position, electrical energy will be transferred from the wireless power transmitter 40 to the wireless power receiver 50. FIG. 5 illustrates a wireless power receiver 50 which has been moved to be away from the wireless power transmitter 40 such that the wireless power receiver 50 is not in range of the wireless power transmitter 40. In such a position, electrical energy will not be transferred (or will be transferred with reduced efficiency depending on the distance).

The wireless power receiver 50 will generally be attached to or positioned on the carriage 30 at various locations of the carriage 30, such as but not limited to its lower surface 32. Correspondingly, the wireless power transmitter 40 will generally be positioned on or around the exercise machine 20 such that the wireless power transmitter 40 and the wireless power receiver 50 are positioned and oriented to transfer electrical energy when the carriage 30 is in at least one position along its path of movement.

The position of the carriage 30 which allows for charging may vary in different embodiments. In a preferred embodiment, the carriage 30 will be in position for charging when at its natural, resting position. Such a resting position may be at either of the ends 25, 26 of the frame 21, such as near the first end platform 70 or the second end platform 72, or may be at various positions between the ends 25, 26 of the frame 21, such as a mid-point of the one or more rails 23, 24. However, in certain embodiments, the carriage 30 may be in a charging position when not at rest, such as anywhere along the movement path of the carriage 30.

The wireless power transmitter 50 may be secured to the exercise machine 20, may be integral with the exercise machine 20, or may be simply positioned near the exercise machine 20. FIG. 3 illustrates an embodiment in which the wireless power transmitter 50 is attached to a spring box 37, with the spring box 37 itself being attached to the frame 21. FIG. 6 illustrates an embodiment in which the wireless power transmitter 50 is attached to a cross bar 29 of the frame 21. FIG. 8 illustrates an embodiment in which the wireless power transmitter 50 may be attached to either of the end platforms 70, 72.

FIG. 7 illustrates an embodiment in which the wireless power transmitter 50 is positioned on a surface underlying the exercise machine 20. In some embodiments, the wireless power transmitter 50 may be attached to a structure which is independent of the exercise machine 20, such as a clamp or bracket positioned adjacent to the exercise machine 20.

It should be appreciated that the wireless power receiver 50 may directly power one or more electrical devices 60 of the exercise machine 20. In other embodiments, the wireless power receiver 50 may instead power a battery 54 from which the one or more electrical devices 60 draw power. In yet another embodiment, a hybrid configuration may be utilized in which the one or more electrical devices 60 draw power from the wireless power receiver 50 when the wireless power receiver 50 is in range of the wireless power transmitter 40, and from the battery 54 when the wireless power receiver 50 is not in range of the wireless power transmitter 40. One or more control units 64 may be utilized to control operation of the wireless power transmitter 40 and/or wireless power receiver 50.

Figure 14:
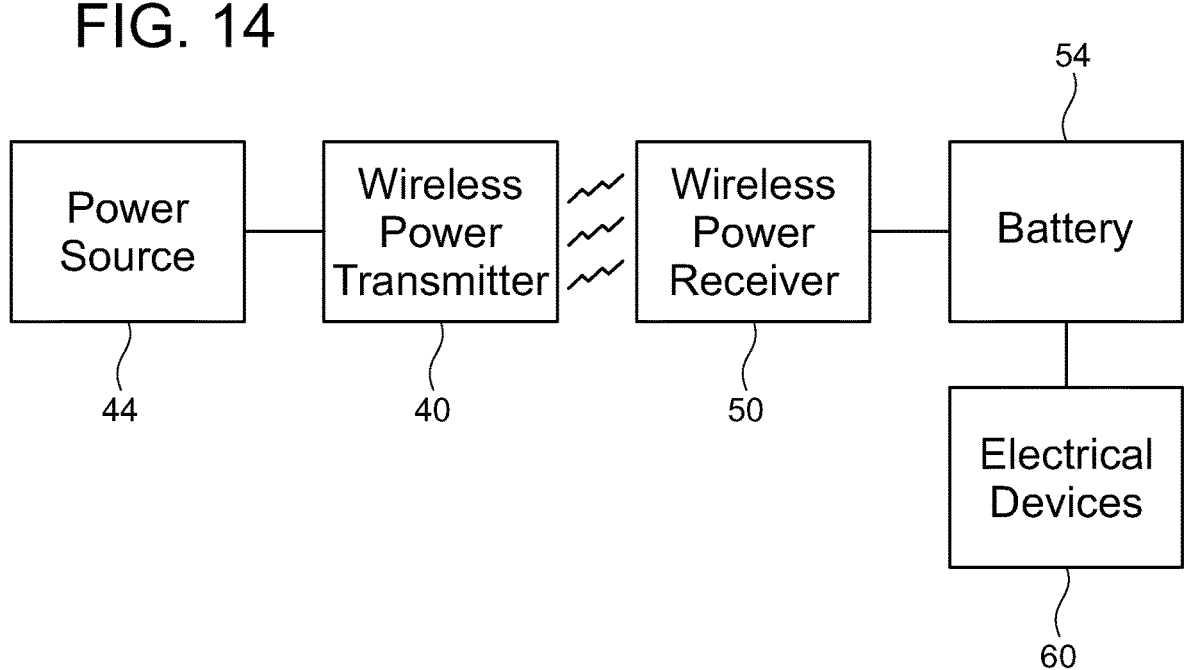
FIG. 14 is a block diagram illustrating a wireless power system for an exercise machine including a battery in accordance with an example embodiment.

FIG. 14 illustrates an embodiment in which the wireless power receiver 50 charges the battery 54, with the electrical devices 60 drawing power from the battery 54 rather than directly from the wireless power receiver 50. It can be seen that the wireless power transmitter 40 is electrically connected by a wired connection with a power source 44. When in range, the wireless power transmitter 40 will wirelessly transfer electrical energy to the wireless power receiver 50, which is electrically connected by a wired connection with the battery 54. The battery 54 itself is electrically connected to one or more electrical devices 60 which draw power from the battery 54.

Figure 15:
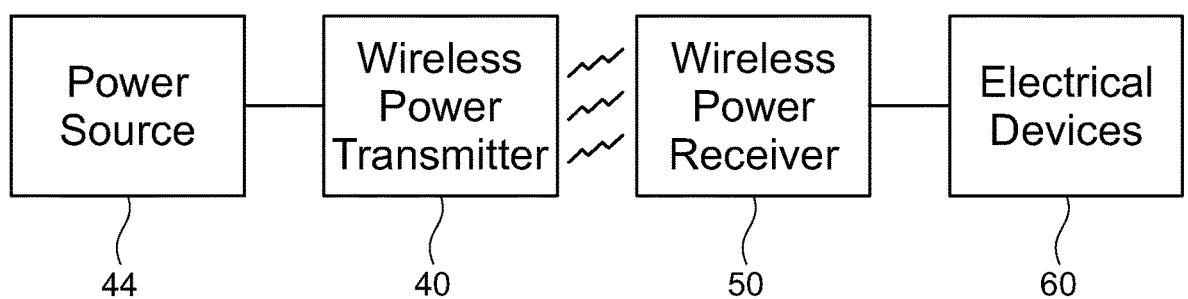
FIG. 15 is a block diagram illustrating a wireless power system for an exercise machine with directly-powered electrical devices in accordance with an example embodiment.

FIG. 15 illustrates an alternate embodiment in which the one or more electrical devices 60 instead draw power directly from the wireless power receiver 50. In such embodiments, the one or more electrical devices 60 may include their own batteries which are charged by the wireless power receiver 50. Alternatively, the one or more electrical devices 60 may only draw power when the wireless power transmitter 40 and the wireless power receiver 50 are in range of each other. Such a configuration may be utilized when the electrical devices 60 need only be active while the carriage 30 is not in movement. For example, the carriage 30 may include lights 67 which are only illuminated when the carriage 30 is at rest, with the lights 67 being deactivated upon the carriage 30 being moved out of range of the wireless power transmitter 40.

Figure 16:
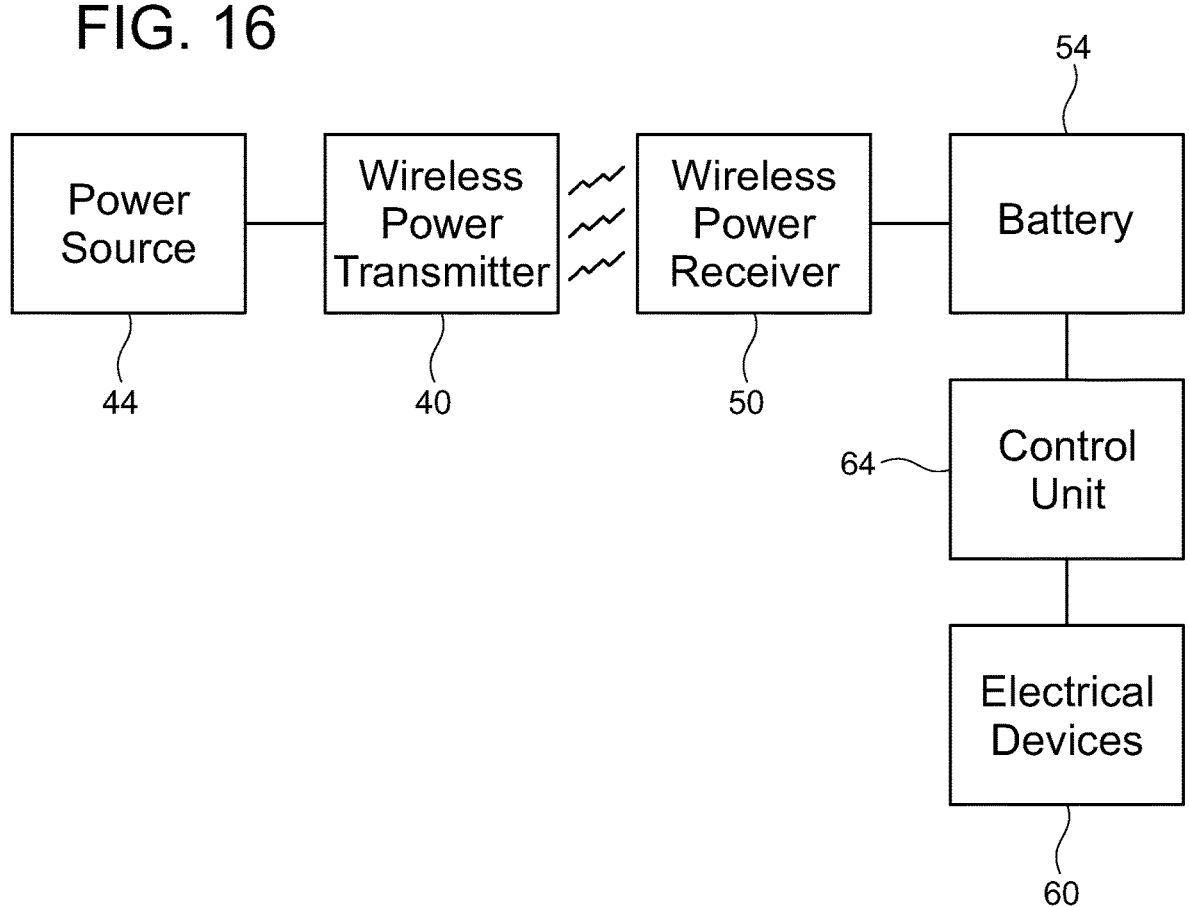
FIG. 16 is a block diagram illustrating a wireless power system for an exercise machine including a control unit in accordance with an example embodiment.

FIG. 16 illustrates an embodiment in which a common control unit 64 is connected to each of the electrical devices 60 to control the electrical devices 60. In such an embodiment, it can be seen that a battery 54 is charged by the wireless power receiver 50 with power received from the wireless power transmitter 40. The battery 54 powers the control unit 64, which is utilized to control operation and functionality of one or more electrical devices 60 that are similarly powered by the battery 54.

FIG. 17 illustrates multiple electrical devices 60 comprised of a resistance selector device 61 including actuators 62, lights 67, biometric sensors 66, speakers 68, and a display screen 69 being connected to a common control unit 64. Although four actuators 62 are shown, it should be appreciated that more or less actuators 62 may be utilized in different embodiments. It should also be appreciated that, in some embodiments, one or more of the electrical devices 60 may include its own control unit 64 as an alternative to, or in addition to, the common control unit 64 shown.

The manner in which the exercise machine 20 is used by an exerciser will vary in different embodiments. A wide range of exercise movements may be performed by the exerciser using various features of the exercise machine 20, including but not limited to use of the movable carriage 30 and/or end platforms 70, 72. As one example, an exerciser may mount the movable carriage 30, selectively connect one or more bias members 38 to the movable carriage 30 to impart a resistance force, and then move the movable carriage 30 back-and-forth along its movement path to perform an exercise.

The exerciser may benefit from any electrical devices 60 which are included with the exercise machine 20. Any such electrical devices 60 will preferably be ready for use as soon as the exerciser arrives at the exercise machine 20; the electrical devices 60 being powered either by the battery 54 which has been charged by electrical energy received by the wireless power receiver 50, or directly by the wireless power receiver 50.

The battery 54 will be freely charged at any time that the wireless power receiver 50 is in range of the wireless power transmitter 40. While in range, the wireless power transmitter 40 will transmit electrical energy received from the power source 44 to the wireless power receiver 50. In a battery-charging embodiment such as shown in FIG. 14, the electrical energy will then be transferred to the battery 54 so as to charge the battery 54. In this manner, the battery 54 will remain charged for use, having been charged when the carriage 30 has been idle (i.e., when the exercise machine 20 has not been in use).

In a direct-powered embodiment such as shown in FIG. 15, the electrical energy will be transferred directly to the electrical devices 60 to power the electrical devices 60 or to charge a battery of the electrical devices 60. In a hybrid embodiment, the wireless power receiver 50 may both charge the battery 54 and power the electrical devices 60. In such an embodiment, the electrical devices 60 may be powered directly by the wireless power receiver 50 when the wireless power receiver 50 is in range of the wireless power transmitter 40. When the wireless power receiver 50 is not in range of the wireless power transmitter 40, the electrical devices 60 will be powered instead by the battery 54.

In use, the exerciser may activate any electrical devices 60 desired for use with exercises being performed by the exerciser on the exercise machine 20. For example, the exerciser may desire to adjust the level of resistance applied against movement of the carriage 30. The exerciser may thus utilize the resistance selector device 61, which will individually extend one or more actuators 62 so as to engage one or more connectors 63 with one or more bias members 38. The actuators 62 will receive power from the wireless power receiver 50; either directly when the wireless power receiver 50 is in range of the wireless power transmitter 40 or indirectly through the battery 54 when the wireless power receiver 50 is not in range of the wireless power transmitter 40. With the desired number of bias members 38 connected to the carriage 30, the exerciser may perform his or her exercise movements.

As another example, an exerciser may desire entertainment while exercising. In such a situation, the exerciser may activate the display screen 69 and speakers 68 to play a video or the like. The display screen 69 and speakers 68 will receive power either directly from the wireless power receiver 50 or from the battery 54, thus allowing the exerciser to enjoy the video while exercising without worrying about replacing batteries or routing wires and the like.

As yet another example, the carriage 30 may include lights 67 which are adapted to illuminate when the carriage 30 is in its resting position. In such an embodiment, the lights 67 may be electrically connected directly to the wireless power receiver 50; with the battery 54 being optionally omitted. When the carriage 30 is in its resting position, the wireless power transmitter 40 will be in range of the wireless power receiver 50 so as to transfer electrical energy to the wireless power receiver 50 to directly power the lights 67.

In this manner, the carriage 30 may be illuminated to let the exerciser know that the carriage 30 is in its resting position. Such an embodiment may be utilized in combination with a battery 54; with the lights 67 providing a visual indication that the wireless power transmitter 40 is in range of the wireless power receiver 50 such that the battery 54 is being charged. If the light 67 in such an embodiment is not illuminated, the exerciser will know that the wireless power transmitter 40 and wireless power receiver 50 are not in range, and thus charging is not being performed.

Unless otherwise defined, all technical and scientific terms used herein have the same meaning as commonly understood by one of ordinary skill in the art to which this invention belongs. Although methods and materials similar to or equivalent to those described herein can be used in the practice or testing of the wireless power system for an exercise machine, suitable methods and materials are described above. All patent applications, patents, and printed publications cited herein are incorporated herein by reference in their entireties, except for any definitions, subject matter disclaimers or disavowals, and except to the extent that the incorporated material is inconsistent with the express disclosure herein, in which case the language in this disclosure controls. The wireless power system for an exercise machine may be embodied in other specific forms without departing from the spirit or essential attributes thereof, and it is therefore desired that the present embodiment be considered in all respects as illustrative and not restrictive. Any headings utilized within the description are for convenience only and have no legal or limiting effect.

What is claimed is:
1. An exercise machine, comprising:
a frame;
a carriage movably positioned upon the frame;
a rechargeable battery attached to the carriage;
an electrical device attached to the carriage, wherein the electrical device is electrically connected to the rechargeable battery;
a wireless power receiver attached to the carriage, wherein the wireless power receiver is electrically connected to the rechargeable battery; and a wireless power transmitter adapted to wirelessly transmit electrical energy to the wireless power receiver, wherein the wireless power receiver is adapted to charge the rechargeable battery with electrical energy received from the wireless power transmitter.

2. The exercise machine of claim 1, wherein the wireless power transmitter is positioned below the carriage and below the wireless power receiver.

3. The exercise machine of claim 1, wherein the wireless power transmitter is attached to the frame.

4. The exercise machine of claim 1, further comprising a platform attached to the frame, wherein the wireless power transmitter is attached to the platform.

5. The exercise machine of claim 1, wherein the wireless power receiver is attached to a lower surface of the carriage.

6. The exercise machine of claim 1, wherein the wireless power transmitter is positioned between a first end and a second end of the frame.

7. The exercise machine of claim 1, wherein the electrical device is comprised of a resistance selector device attached to the carriage for releasably engaging with one or more bias members.

8. The exercise machine of claim 1, wherein the electrical device is comprised of a control unit.

9. The exercise machine of claim 8, wherein the control unit is in communication with a secondary electrical device attached to the carriage.

10. The exercise machine of claim 1, wherein the carriage is movable between a first position and a second position, wherein the wireless power transmitter transmits electrical energy to the wireless power receiver when the carriage is near the first position, and wherein the wireless power transmitter does not transmit electrical energy to the wireless power receiver when the carriage is not near the first position.

11. The exercise machine of claim 10, wherein the first position is comprised of a resting position of the carriage.

12. The exercise machine of claim 10, wherein the carriage is near an end platform attached to the frame when in the first position.

13. The exercise machine of claim 1, wherein the frame includes at least one rail, wherein the carriage is movably positioned upon the at least one rail.

14. The exercise machine of claim 1, including a bias member adapted to be connected to the carriage, wherein the bias member applies a biasing force against movement of the carriage when connected to the carriage.

15. The exercise machine of claim 1, wherein the wireless power transmitter is adapted to wirelessly transmit electrical energy to the wireless power receiver using near field transmission.

16. The exercise machine of claim 15, wherein the wireless power transmitter is adapted to wirelessly transmit electrical energy to the wireless power receiver using a magnetic field.

17. The exercise machine of claim 16, wherein the wireless power transmitter is adapted to wirelessly transmit electrical energy to the wireless power receiver using inductive coupling.

18. The exercise machine of claim 1, wherein the wireless power transmitter is adapted to wirelessly transmit electrical energy to the wireless power receiver using an electrical field.

19. An exercise machine, comprising:
a frame;
a carriage movably positioned upon the frame;
an end platform attached to the frame near an end of the frame;
a rechargeable battery attached to the carriage;
a wireless power receiver attached to a lower surface of the carriage, wherein the wireless power receiver is electrically connected to the rechargeable battery; and
a wireless power transmitter adapted to wirelessly transmit electrical energy to the wireless power receiver, wherein the wireless power receiver is adapted to charge the rechargeable battery with electrical energy received from the wireless power transmitter, and wherein the wireless power transmitter is attached to the frame or the end platform;
wherein the carriage is movable between a first position and a second position, wherein the wireless power transmitter transmits electrical energy to the wireless power receiver when the carriage is near the first position, and wherein the wireless power transmitter does not transmit electrical energy to the wireless power receiver when the carriage is not near the first position.

20. An exercise machine, comprising:
a frame;
a carriage movably positioned upon the frame;
an end platform attached to the frame near an end of the frame;
a rechargeable battery attached to the carriage;
an electrical device attached to the carriage, wherein the electrical device is electrically connected to the rechargeable battery;
a wireless power receiver attached to the carriage, wherein the wireless power receiver is electrically connected to the rechargeable battery by a wired connection; and
a wireless power transmitter adapted to wirelessly transmit electrical energy to the wireless power receiver, wherein the wireless power receiver is adapted to charge the rechargeable battery with electrical energy received from the wireless power transmitter;
wherein the wireless power transmitter is attached to the frame or the end platform;
wherein the carriage is movable between a first position and a second position, wherein the wireless power transmitter transmits electrical energy to the wireless power receiver when the carriage is near the first position, and wherein the wireless power transmitter does not transmit electrical energy to the wireless power receiver when the carriage is not near the first position;
wherein the first position is comprised of a resting position of the carriage.

* * * * *